(12) United States Patent
Jin et al.

(10) Patent No.: US 9,368,130 B2
(45) Date of Patent: Jun. 14, 2016

(54) DATA STORAGE SYSTEM, METHOD OF WRITING TO STORAGE IN THE DATA STORAGE SYSTEM, HARD DISK AND METHOD OF FORMING THE HARD DISK

(71) Applicant: MARVELL INTERNATIONAL LTD., Hamilton (BM)

(72) Inventors: Chao Jin, Singapore (SG); Weiya Xi, Singapore (SG); Khai Leong Yong, Singapore (SG); Zhi Yong Ching, Singapore (SG)

(73) Assignee: Marvell International Ltd., Hamilton (BM)

( * ) Notice: Subject to any disclaimer, the term of this patent is extended or adjusted under 35 U.S.C. 154(b) by 238 days.

(21) Appl. No.: 13/942,862

(22) Filed: Jul. 16, 2013

(65) Prior Publication Data
US 2014/0019680 A1    Jan. 16, 2014

Related U.S. Application Data

(60) Provisional application No. 61/671,827, filed on Jul. 16, 2012, provisional application No. 61/715,337, filed on Oct. 18, 2012.

(51) Int. Cl.
*G11B 5/012* (2006.01)
*G11B 20/12* (2006.01)

(52) U.S. Cl.
CPC ............ *G11B 5/012* (2013.01); *G11B 20/1217* (2013.01); *G11B 2220/2508* (2013.01); *G11B 2220/2516* (2013.01); *G11B 2220/40* (2013.01)

(58) Field of Classification Search
CPC .. G11B 5/012; G11B 5/5526; G11B 20/1217; G11B 5/5521; G11B 5/59633; G11B 2020/10981; G11B 2020/1238; G11B 20/1833; G11B 2020/1062; G11B 20/1252; G11B 20/1258; G11B 2220/2508; G11B 2220/40; G11B 2220/65; G11B 2220/2516; G06F 3/0676
See application file for complete search history.

(56) References Cited

U.S. PATENT DOCUMENTS

| | | | |
|---|---|---|---|
| 7,870,172 B1 | 1/2011 | Sarma | |
| 7,996,645 B2 | 8/2011 | New et al. | |
| 8,194,340 B1* | 6/2012 | Boyle et al. | 360/48 |
| 8,521,972 B1* | 8/2013 | Boyle et al. | 711/159 |
| 8,699,159 B1* | 4/2014 | Malina | 360/31 |
| 8,699,175 B1* | 4/2014 | Olds et al. | 360/78.14 |
| 8,756,382 B1* | 6/2014 | Carlson et al. | 711/154 |
| 9,128,820 B1* | 9/2015 | Malina | G06F 12/0238 |
| 2007/0294310 A1* | 12/2007 | Yagawa | 707/200 |
| 2011/0075292 A1* | 3/2011 | New et al. | 360/77.04 |
| 2011/0179219 A1 | 7/2011 | Ma et al. | |
| 2011/0202707 A1 | 8/2011 | Moon et al. | |
| 2013/0335856 A1* | 12/2013 | Tanabe et al. | 360/76 |

OTHER PUBLICATIONS

Written Opinion for Singapore Patent Application No. 2013054424 dated Sep. 26, 2014, pp. 1-11.
Search Report for Singapore Patent Application No. 2013054424 dated Sep. 26, 2014, pp. 1-7.

* cited by examiner

*Primary Examiner* — Hashem Farrokh

(57) ABSTRACT

In various embodiments, a data storage system may be provided. The data storage system may include a storage. The storage may include a first portion and a second portion. The data storage system may further include a determination circuit configured to determine whether to write data to the first portion or to the second portion. The data storage system may also include a control circuit configured to control writing the data to the first portion in a log structured manner.

14 Claims, 22 Drawing Sheets

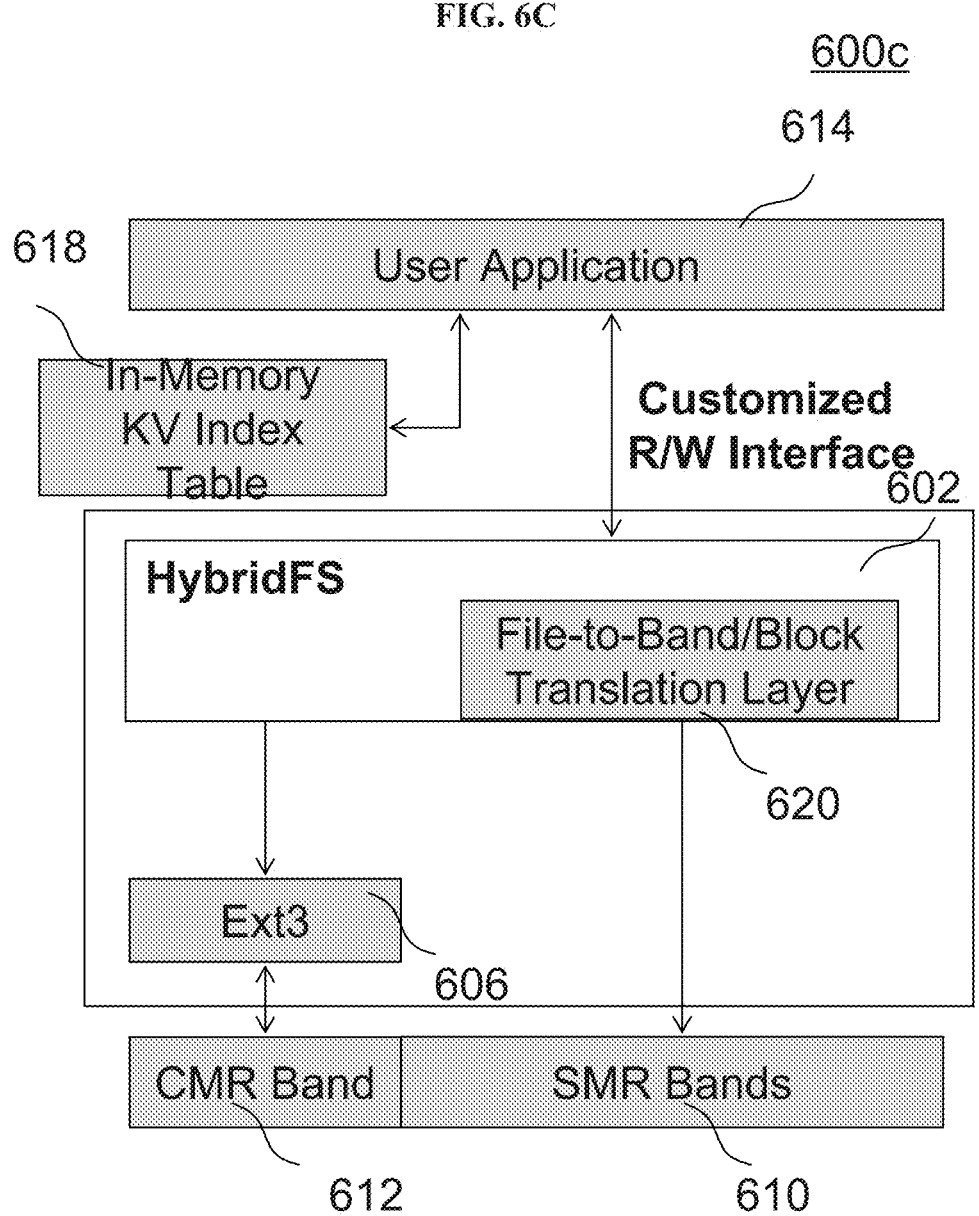

Forming a plurality of shingled magnetic recording zones in the hard disk

1402

Forming a conventional magnetic recording zone in the hard disk

1404

DATA STORAGE SYSTEM, METHOD OF WRITING TO STORAGE IN THE DATA STORAGE SYSTEM, HARD DISK AND METHOD OF FORMING THE HARD DISK

CROSS-REFERENCE TO RELATED APPLICATIONS

This application claims the benefit of priority of U.S. application No. 61/671,827 filed Jul. 16, 2012 and U.S. application No. 61/715,337 filed Oct. 18, 2012, the contents of them being hereby incorporated by reference in their entirety for all purposes.

TECHNICAL FIELD

Various aspects of this disclosure relate to data storage systems, methods of writing to storage in data storage systems, hard disks and methods of forming hard disks.

BACKGROUND

A conventional disk drive usually contains a single disk media for data storage. For example, a conventional hard disk drive contains only magnetic disk media, and a solid state drive (SSD) contains only flash media. Recently, hybrid storage devices, which combine different storage media in a single device, have drawn increasing interests from storage vendors and customers. Hybrid storage devices could be in many different forms. Just to name a few, a hybrid disk drive may contain a conventional disk media plus a non-volatile memory (NVM), in which the NVM serves as a data cache to the disk media for performance and energy efficiency purposes; an SSD may contain large capacity and low cost multi-level cells as well as small capacity and high cost and performance phase change memory. Besides single hybrid storage devices, a hybrid storage array is often seen in the market. A hybrid disk array may be an array of conventional hard disk drives (HDDs) with an extra NVM or SSD cache device attached to the array controller. The array may instead include SSDs and large amount of HDDs. The objective of having hybrid storage device/array may include achieving high capacity and high performance and/or low power consumption with low cost.

Certain storage media/recording technology may require special way to access it. For example, NAND flash can only be written sequentially within a data block. Similarly, shingled magnetic recording (SMR) disks may only be written through appending and not updating-in-place.

SUMMARY

In various embodiments, a data storage system may be provided. The data storage system may include a storage. The storage may include a first portion and a second portion. The data storage system may further include a determination circuit configured to determine whether to write data to the first portion or to the second portion. The data storage system may also include a control circuit configured to control writing the data to the first portion in a log structured manner.

In various embodiments, a hard disk may be provided. The hard disk may include a plurality of shingled magnetic recording zones. The hard disk may further include a conventional magnetic recording zone.

In various embodiments, a method of writing data to a storage in a data storage system may be provided. The storage may include a first portion and a second portion. The method may include determining whether to write data to the first portion or to the second portion. The method may further include controlling writing the data to the first portion in a log structure manner.

In various embodiments, a method of forming a hard disk may be provided. The method may include forming a plurality of shingled magnetic recording zones in the hard disk. The method may further include forming a conventional magnetic recording zone in the hard disk.

BRIEF DESCRIPTION OF THE DRAWINGS

The invention will be better understood with reference to the detailed description when considered in conjunction with the non-limiting examples and the accompanying drawings, in which:

FIG. 6C shows the data storage system in FIG. 6A further configured according to various embodiments.

FIG. 14 shows a method of forming a hard disk according to various embodiments.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In order that the invention may be readily understood and put into practical effect, particular embodiments will now be described by way of examples and not limitations, and with reference to the figures.

Figure 1:
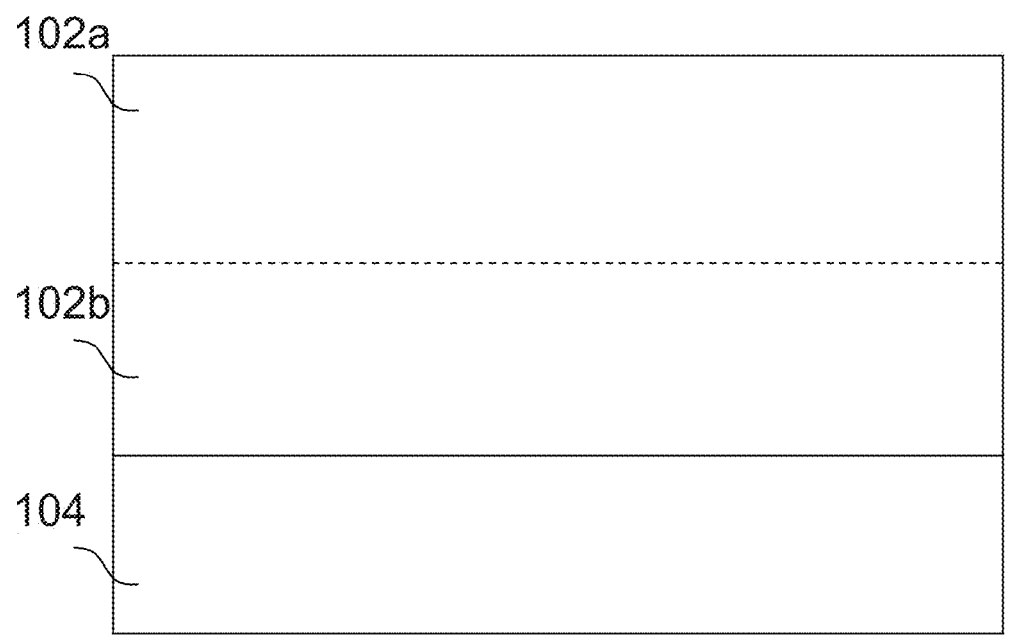
FIG. 1 shows a hard disk according to various embodiments.

FIG. 1 is a schematic 100 showing a hard disk according to various embodiments. The hard disk may include a plurality of shingled magnetic recording (SMR) zones 102a, 102b. The hard disk may further include a conventional magnetic recording (CMR) zone 104.

In other words, the hard disk may include a zone configured for conventional magnetic recording 104. The hard disks may further include a plurality of zones configured for shingled magnetic recording 102a, 102b.

In various embodiments, a first shingled magnetic recording zone, e.g. 102a of the plurality of shingled magnetic recording zones 102a, 102b may be separated from a second shingled magnetic recording zone, e.g. 102b of the plurality of shingled magnetic recording zones 102a, 102b by an inter-zone gap. In other words, two shingled magnetic recording zones 102a, 102b may be neighbouring to each other. When two shingled magnetic recording zones 102, 102b are neighbouring to each other, they are only separated by an inter-zone gap. Advantageously, the writing of data in the first shingled magnetic recording zone 102a may not disturb or distort the data in the second shingled recording zone 102b or any other shingled magnetic zones neighbouring to the first shingled magnetic recording zone due to the inter-zone gap or gaps.

In various alternate embodiments, a first shingled magnetic recording zone, 102a of the plurality of shingled magnetic recording zones 102a, 102b is separated from a second shingled magnetic recording zone 102b of the plurality of shingled magnetic recording zones 102a, 102b by the conventional magnetic recording zone 104.

Each shingled magnetic recording (SMR) zone 102a, 102b may include a plurality of shingled or overlapping tracks. For instance, a first track may be overlapped by a second track immediately adjacent (i.e. contiguous) to the first track and the second track may be overlapped by a third track immediately adjacent (i.e. contiguous) to the second track. The width of a writing element may be larger than the track pitch (i.e. the non-overlapped portions of the width of a data track). The width of a reading element may be smaller than the track pitch so that the read element is configured only to read data from a single track. With the relatively wide writing element, the writing element may generate higher fields at the disk and allows the disk coercivities to increase, grain size to decrease and recording densities of the SMR zone to increase. Each shingled magnetic zone 102a, 102b may include more than two shingled tracks.

Each conventional magnetic recording (CMR) zone 104 may include one or more isolated tracks. In other words, each track in the CMR zone is isolated from a neighbouring track by an inter-track gap.

In various embodiments, the shingled magnetic recording (SMR) zones may be configured to be written with data in a log structured manner. Data may be written to the first portion in the form of a circular log in the first portion. The log may have a header and an end defining the data written to the first portion. As new data is written to the log, the header of the log moves relative to the end. In other words, the header of the log moves one round around the circular log to meet the end of the log as new data is appended to the header. Unwanted old data may be marked (as invalid data). As the header moves past the end to rewrite new data on the old data, the marked old data (i.e. the invalid data) may be discarded or removed. The unmarked old data (i.e. the wanted data) may be appended to the header of the log as new data.

The first portion including the plurality of shingled or overlapping tracks may not allow for random access write to any arbitrary track, because the need to rewrite one track may cause overwriting of the information stored in neighbouring shingled tracks.

In various embodiments, the conventional magnetic recording (CMR) zones may be configured to be written with data in a random access manner. As the tracks in the CMR zones are isolated, random access writes (i.e. writing in a random access manner) may not distort or disturb the data written in neighbouring tracks of the CMR zone.

Figure 2:
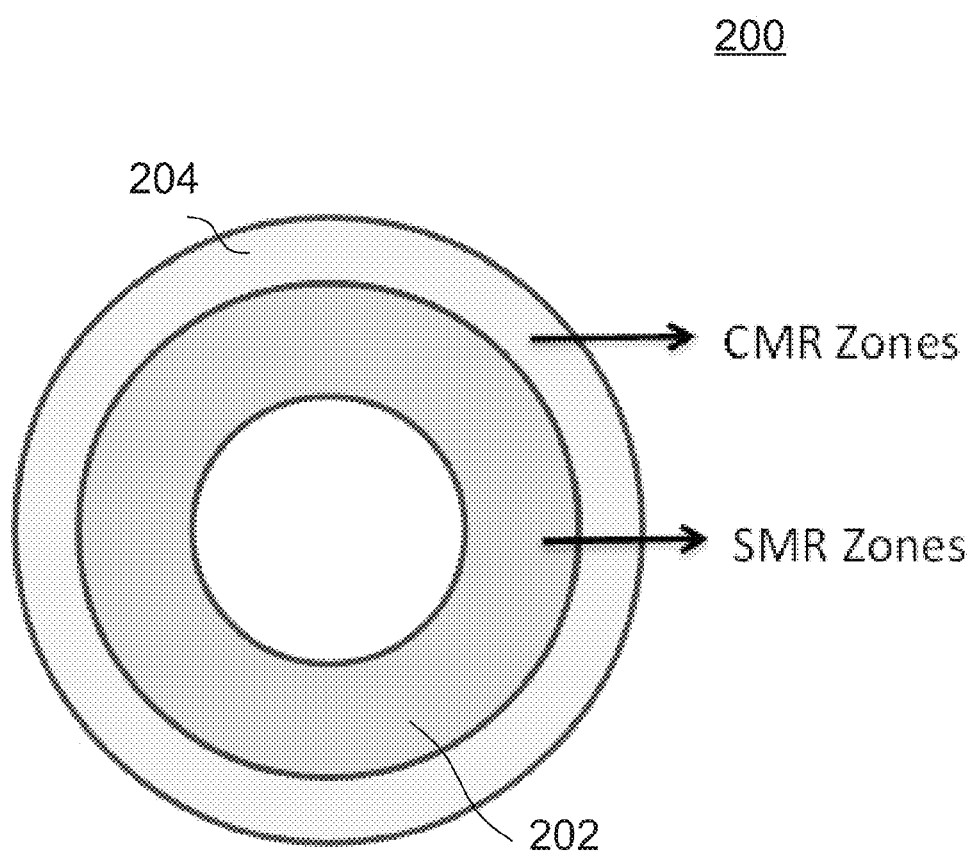
FIG. 2 shows a hard disk according to various embodiments.

FIG. 2 is a schematic 200 showing a hard disk according to various embodiments. The hard disk may include a first portion or partition including logically consecutively addressable shingled magnetic recording (SMR) zones. The first partition may include contiguous SMR zones separated from one other only by inter-zonal gaps. The hard disk may further include a second portion or partition 204 including at least one conventional magnetic recording zone. If the second partition 204 includes more than one conventional magnetic recording zone, the conventional magnetic recording zones may be logically consecutively addressable. The more than one conventional CMR zones may be contiguous and separated from one another only by the gaps (i.e. the inter-track gaps) between the isolated tracks in each CMR zones.

Figure 3:
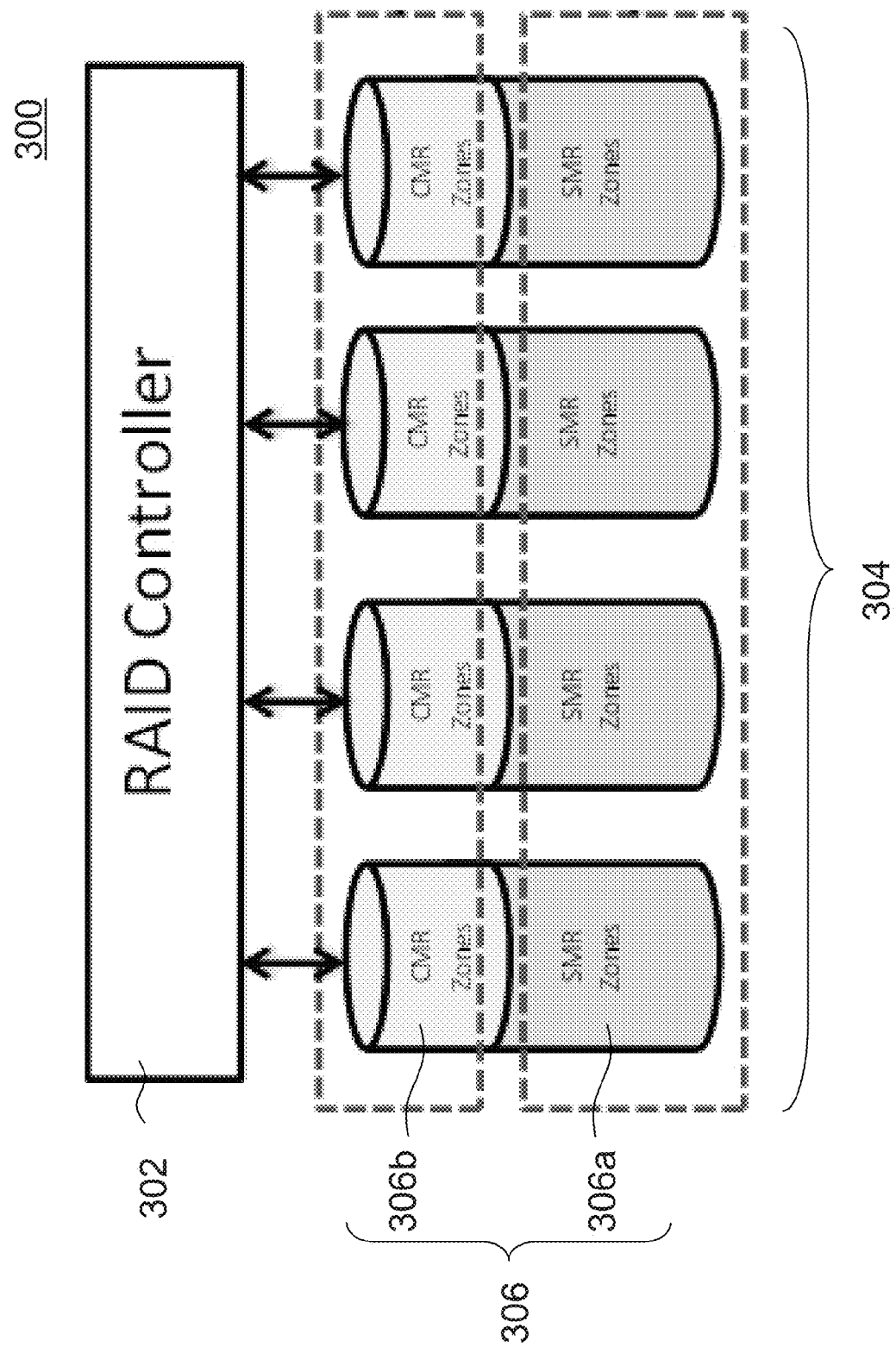
FIG. 3 shows a storage array according to various embodiments.

FIG. 3 is a schematic 300 showing a storage array according to various embodiments. The storage array may include an array circuit 302. The storage array may include a plurality of hard disks 304 controlled by or coupled to the array circuit 302. Each hard disk 306 may include a plurality of shingled magnetic recording (SMR) zones 306a and a conventional magnetic recording (CMR) zone 306b. The plurality of hard disks 304 may include a first portion 304a including the shingled magnetic recording zones of the plurality of hard disks 304. The plurality of hard disks 304 may further include a second portion including the conventional magnetic recording zones of the plurality of hard disks 304.

In various embodiments, the storage may include a redundant array of independent disks (RAID) storage. The array circuit 302 may include a RAID controller or a RAID architecture. The RAID controller may manage the address mapping and translation of the plurality of hard disks 304, providing the upper level an unified logical address space. In particular, for some RAID levels such as RAID 0 or RAID 5, the hard disks are crossly addressed. For other RAID levels such as RAID 1, the hard disks are addressed in mirrors. In both cases, the CMR zones on the plurality of hard disks are consecutively addressed to form a CMR partition. Correspondingly, the SMR zones on the plurality of hard disks are consecutively addressed to form a SMR partition.

Figure 4:
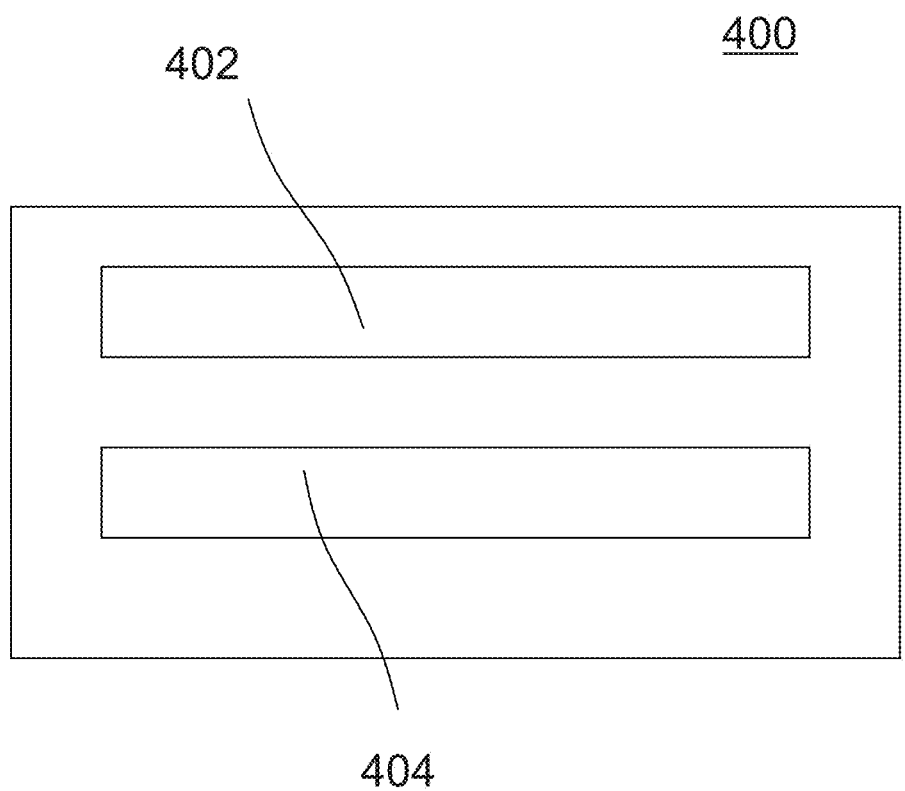
FIG. 4 shows a data storage system for accessing a storage according to various embodiments.

FIG. 4 is a schematic 400 showing a data storage system for accessing a storage according to various embodiments. The storage may include a first portion and a second portion. The data storage system may further include a determination circuit 402 configured to determine whether to write data to the first portion or to the second portion. The data storage system may also include a control circuit 404 configured to control writing the data to the first portion in a log structured manner.

In other words, the data storage system may include a determination circuit 402 configured to determine whether to write to a first portion or to a second portion of a storage. The storage system may further include a control circuit 404 configured to control a writing element for writing data to the first portion using a log structured approach.

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with various alternative embodiments.

The data storage system may be or may include a file system architecture or system controller. In various embodiments, the data storage system may be or may include an unified file system controller. The data storage system may include two or more independent file systems controlled by the unified file controller. Each independent file system may control or access a portion of the storage. The unified file system controller may be or may include the determination circuit 402. The data storage system may include a log-structured file system branch for controlling and/or accessing the first portion. The data storage system may include a conventional file system branch for controlling and/or accessing the second portion. The log-structured file system branch and the conventional file system branch may be implemented by the control circuit. In various embodiments, the log-structured file system branch may be implemented by a first control sub-circuit. In various embodiments, the conventional file system branch may be implemented by a second control sub-circuit. The second control sub-circuit may be electrically isolated from the first control sub-circuit or may be electrically coupled to the first control sub-circuit. In various embodiments, the first control sub-circuit and the second control sub-circuit may be separate. In various embodiments, the first control sub-circuit may be the second control sub-circuit. In various embodiments, reference to the control circuit 404 may include references to the first control sub-circuit and/or the second control sub-circuit.

In various embodiments, the first control sub-circuit may be configured to control writing the data to the first portion in a log structured manner. The unified file controller may include a read/write strategy module or an access module. The read/write strategy module may be implemented by the determination circuit.

The data storage system may instead be or include a single file system such as a hybrid file system. The determination circuit 402 may include a file caching/placement module and/or a metadata management module.

In various embodiments, the control circuit 404 (e.g. the second control sub-circuit) may be further configured to control writing data to the second portion in a random access manner. The control circuit 404 (e.g. the first control sub-circuit) may be configured to control writing the data to the first portion in a log structured manner if the determination circuit 402 determines to write data to the first portion. The control circuit 404 (e.g. the second control sub-circuit) may instead be configured to control writing the data to the second portion in a random access manner if the determination circuit 402 determines to write data to the second portion.

In various alternate embodiments, the control circuit 404 (e.g. the second control sub-circuit) may be further configured to control writing data to the second portion in the log structured manner. In other words, the control circuit (e.g. the first and second control sub-circuits) may be configured to control writing to the first portion or to the second portion in the log structured manner whether the determination circuit 402 determines whether to write to the first portion or to the second portion.

In various embodiments, to control writing the data to the first portion in a log structured manner may include to control writing data in the form of a circular log in the first portion. The log may have a header and an end defining the data written to the first portion. Controlling writing the data to the first portion in a log structured manner may further include appending new data to the header of the log, the new data causing the header to move relative to the end. Writing data by appending new data to the header of the log may be referred to as the circular log based approach.

In other words, data may be stored in the form of a circular log on the first portion of the storage. The log has a header and an end, both the header and the end defining the data stored between the header and the end. As new data is added to the log, the header moves relative to the log. As the log is circular, the header initially moves away from the end. As new data is written to the log, the header of the log moves one round to meet the end of the log as new data is appended to the header.

In various embodiments, to control writing the data to the second portion in a log structured manner may include to control writing data in the form of a circular log in the second portion.

The data storage system may further include a marking circuit configured to mark unwanted old data on the first portion. In other words, the data storage system may be configured to mark unwanted old data as invalid.

Old data may be referred to as data already written on the storage. On the other hand, new data may be referred to as data that is not already stored on the storage.

In various embodiments, to control writing data to the first portion in the log structure manner may include to control writing of new data over old data by appending unmarked old data to the header and to remove marked old data. In other words, the marked data (wanted old data) is added to the new data between the header and the end of the log. The marked data (invalid data or unwanted old data) may be discarded or deleted. The data storage system may include a garbage collector circuit to discard or delete the marked old data or invalid data for freeing up occupied space. In various embodiments, the garbage collected circuit and the marking circuit may be the same circuit.

In various embodiments, the new data may overwrite the unwanted old data as well as the wanted old data. The wanted old data may be appended to the header as new data.

The circular log may include a plurality of segments. The first portion may include a plurality of shingled magnetic recording zones. Each segment of the plurality of segments may correspond to one or more of the plurality of shingled magnetic recording zones. The control circuit 404 configured to control writing data to the first portion in the log structured manner include the control circuit 404 configured to control writing the data within each segment in a sequential manner or sequential appending mode.

The data storage system may further include a selection circuit configured to select one segment out of the plurality of segments for writing of the new data over the old data. The selection circuit may be configured to select the one segment having the most amount of marked old data (invalid data). The control circuit 404 may be further configured to control writing of new data over old data by appending unmarked old data to the header and to remove marked old data within the selected one segment. The writing of new data over old data may be carried out sequentially within the selected one segment. Writing the data in a sequential manner or sequential appending mode may include appending unmarked old data to the header as new data and writing the new data over both the unmarked (wanted) old data and the marked (unwanted) old data.

In various embodiments, to control writing the data to the first portion in a log structured manner may also include to control writing data in the form of bands/segments in the first portion. The bands may be referred to as ring-shaped bands. Controlling writing data in the log structured manner may include controlling writing the data within each segment/band in a sequential manner. The bands/segments are the management units of storage space. Each band/segment may include an appending pointer for new data to append to. The new data may cause the pointer to move relative to a fixed point (e.g. an end) in the segment/band. Writing data within each band/segment may be sequential. New data may be appended to the appending pointer or the header.

Alternatively, each band/segment may include two pointers (a header and an end) and manage the band/segment as a circular log. New data may be appended to the header. As new data is added, the first pointer may move relative to the second pointer, i.e. the header may move relative to the end. Writing the data to segments/bands may be referred to as the band/segment based approach.

The data storage system may include a marking circuit configured to mark unwanted old data within each segment/band. In various embodiments, to control writing data to the first portion in the log structure manner may include to control writing of new data over old data within each segment/band by appending unmarked old data to the header and to remove marked old data. The data storage system may further include a selection circuit configured to select one segment/band out of the plurality of segments/bands for writing of the new data over the old data. The selection circuit may be configured to select the one segment/band having the most amount of marked old data (invalid data). In various embodiments, to control writing to the first portion using the band/segment based approach may further include controlling writing data to the selected band/segment of the plurality of bands/segments in the first portion. In various embodiments, to control writing the data to the first portion using the band/segment based approach may further include to append old wanted data (unmarked data) as new data to the appending pointer or header of another band/segment of the plurality of bands/segment in the first portion.

In various embodiments, to control writing the data to the second portion in a log structured manner may also include to control writing data in the form of bands/segments in the second portion. In various embodiments, to control writing data to the second portion in the log structure manner may include to control writing of new data over old data within each segment/band by appending unmarked old data to the header or appending pointer and to remove marked old data. The data storage system may further include a selection circuit configured to select one segment/band out of the plurality of segments/bands for writing of the new data over the old data. The selection circuit may be configured to select the one segment/band having the most amount of marked old data (invalid data). In various embodiments, to control writing to the second portion using the band/segment based approach may further include controlling writing data to the selected band/segment of the plurality of bands/segments in the second portion. In various other embodiments, to control writing the data to the second portion using the band/segment based approach may further include to append old wanted data (unmarked data) as new data to the appending pointer or header of another band/segment of the plurality of bands/segment in the second portion.

In various embodiments, the determination circuit 402 may be further configured to determine whether to write data to the first portion or to the second portion based on the attributes of the data such as type of file, file size, file popularity etc. In various alternate embodiments, the determination circuit 402 may be configured to determine whether to write data to the first portion or to the second portion may write data to a predetermined default location such as the first portion.

The determination circuit 402 may be further configured to determine whether to write data to the first portion or to the second portion based on whether a relevant old data is located in the first portion or the second portion. For instance, an original file on the storage may be regarded as relevant old data to an updated or modified version of the file. In other words, when a file stored in the storage is modified or updated, the determination circuit 402 may regard the data pertaining to the file as relevant old data to the updated or modified file. If the file is stored in the first portion, the determination circuit 402 may determine that the updated or modified file be also stored in the first portion.

In various embodiments, the determination circuit 402 may be further configured to determine whether to read the data from the first portion or from the second portion. In other words, other than determining the write element whether to write to the first portion or to the second portion, the determination circuit 402 may further determine a read element whether to read from the first portion or from the second portion. In various embodiments, the read element and the write element may be housed in the same read/write head.

In various embodiments, the data storage system may further include an access monitor circuit configured to monitor an access pattern of the data (such as the access pattern and/or access frequency of each file) in the first portion and the second portion. The access monitor circuit may include an access monitor module. The data storage system or access monitor circuit may further include a memory (hash table memory) to store a hash table for recording the access pattern of the data, e.g. recording the access patterns and access frequency of the files at runtime.

The data storage system may further include a file migration circuit (e.g. file migration function or module) configured to move the data between the first portion and the second portion based on the access pattern. The first portion, wherein data is written in a log structured approach, may be configured to store infrequently accessed or sequentially accessed data. The second portion, wherein data is written in a random access manner, may be configured to store frequently and randomly accessed data.

In various embodiments, the operation of the data storage system, including the operation of the file migration circuit, may be transparent to the user.

In various embodiments, the determination circuit 402 may be further configured to determine whether the data is file data or file system metadata (or file metadata). The determination circuit 402 may be configured to determine to write data to the first portion if the data is file data. The determination circuit 402 may be configured to determine to write data to the second portion of the data is file system metadata (or file metadata). File data and system metadata (or file metadata) usually exhibit different access patterns. File system metadata (or file metadata) may draw smaller and more random requests while file data is accessed less often with sequential requests. The determination circuit 402 may be configured to determine to write data to the first portion (including lower performance zones) if the data is file data, which is accessed sequentially and/or less frequently. On the other hand, the determination circuit 402 may be configured to determine to write data to the second portion (including higher performance zones) if the data is file system metadata (or file metadata), which is accessed more frequently and/or more likely to be accessed randomly. File system metadata (or file metadata) may be only about 2% of data but may be read and written frequently (many inputs/outputs). File data may have large size but may be read and written less frequently than file system metadata. File system metadata may also be referred to as metadata.

In various embodiments, the data storage system may further include a memory (metadata memory) configured to store file system metadata. The file system metadata may be in the form of a tree structure comprising a plurality of nodes, each node comprising metadata information of a program file or a directory. The metadata information may include an attribute list and/or an extent list. The extent list may indicate where the data of the file is stored in the storage. A first node may be connected to a second node via pointers. The control circuit 404 may be further configured to write file system metadata in the memory to the second portion at periodic intervals or after metadata change operations. The file system metadata may be written to the second portion in a log file or metadata file.

The data storage system may include a metadata database, the metadata database configured to store file system metadata. The metadata database may be a Structured Query Language (SQL) relational database and may be accessed through the SQL language. In various embodiments, the data storage system may further include the storage. The metadata database may be located in the first portion of the storage, such as in a local file system in the first portion of the storage.

In various alternate embodiments, the control circuit may be configured to control writing the data to the first portion via a shingled translation layer (STL). The shingled translation layer (STL) remaps in-place update to different locations and writes the data through appending. However, STL may incur extra delay in response time and have negative impact on the disk performance In various embodiments, the data storage system may further include the storage. However, the data storage system need not necessarily include the storage.

The storage may include including a first portion and a second portion. In various embodiments, the storage may be or may include a hard disk. In various embodiments, the storage may be a storage array including an array circuit and a plurality of hard disks. In various embodiments, the first portion may include one or more shingled magnetic recording (SMR) zones. In various embodiments, the second portion may include one or more conventional magnetic recording (CMR) zones In various other embodiments, the storage may be or may include a hybrid drive. The hybrid drive may include a first medium and a second medium. For instance, the first medium may be a magnetic medium and the second medium may be a non-volatile memory. The second medium may be configured to serve as a cache for the first medium. In another instance, the first medium may include multi-level memory cells which reduce costs and provide for large capacity. The second medium may include phase change memory which increases the performance of the storage. The first portion may include the first medium and the second portion may include the second medium.

In various embodiments, the storage may be or may include a storage array. The storage array may include an array circuit. The storage array may further include a plurality of hard disks controlled by or coupled to the array circuit. Each of the plurality of hard disks may include one or more shingled magnetic recording zones. Each of the plurality of hard disks may further include one or more conventional magnetic recording zones. The storage array may instead include one or more hard disks as well as one or more solid state drives (or non volatile memory drives) controlled by the array circuit.

The storage may include a first portion including the shingled magnetic recording zones of the plurality of hard disks. The storage may form or include a second portion comprising the conventional magnetic recording zones of the plurality of hard disks. In other words, the plurality of hard disks may include or form a first portion including the shingled magnetic recording zones of the plurality of hard disks. The plurality of hard disks may include or form a second portion comprising the conventional magnetic recording zones of the plurality of hard disks.

The storage array may be or include a redundant array of independent hard disks (RAID). One hard disk of the plurality of hard disks may be configured to store parity information. The remaining hard disks of the plurality of hard disks may be configured to store data. The parity information may be computed based on the data stored in the remaining hard disks. Data blocks of the data may be divided into a plurality of sub-blocks. The plurality of sub-blocks may be stored in the remaining hard disks. Each sub-block of the plurality of sub-blocks may be stored correspondingly in one hard disk of the remaining hard disks.

The storage may be a hybrid device or a hybrid storage device. The hybrid storage device may be a hybrid disk drive including two or more media. The storage may instead by a storage array. The storage array may include of hybrid storage devices or may include different kinds of drives. The drives may be selected from a group including hard disk drives (HDDs), solid state drives (SSDs), banded drives (including CMR zones and SMR zones) and hybrid drives.

In various embodiments, the first portion may have a first characteristic while the second portion may have a second characteristic different from the first characteristic. In various embodiments, the first characteristic may include overlapping tracks and the second characteristic may include isolated tracks. In various embodiments, the first characteristic may include that the first portion is configured such that data may be stored in a first particular manner, e.g. in a log structured manner while the second characteristic may include that the first portion is configured to be stored in a second particular manner, e.g. in a random access manner. In various embodiments, the first characteristics may include a first material such as a magnetic medium while the second characteristics may include a second material such as semiconductor medium. In various embodiments, the first characteristic may include a first device or first portion of a device made of a first material such as a hard disk drive or magnetic medium of a hybrid drive while the second characteristics may include a second device or second portion of a device made of a second material such as a solid state drive (SSD) or solid state cache of a hybrid drive. In various embodiments, the first characteristic may include the first characteristics of a first plurality of sub-portions making up or forming the first portion and the second characteristics may include the second characteristics of a second plurality of sub-portions making up or forming the second portion. For instance, the storage may be a storage array having a first partition formed by the magnetic medium of a plurality of hybrid drives as well as a second partition formed by the solid state caches of the hybrid drives.

Figure 5:
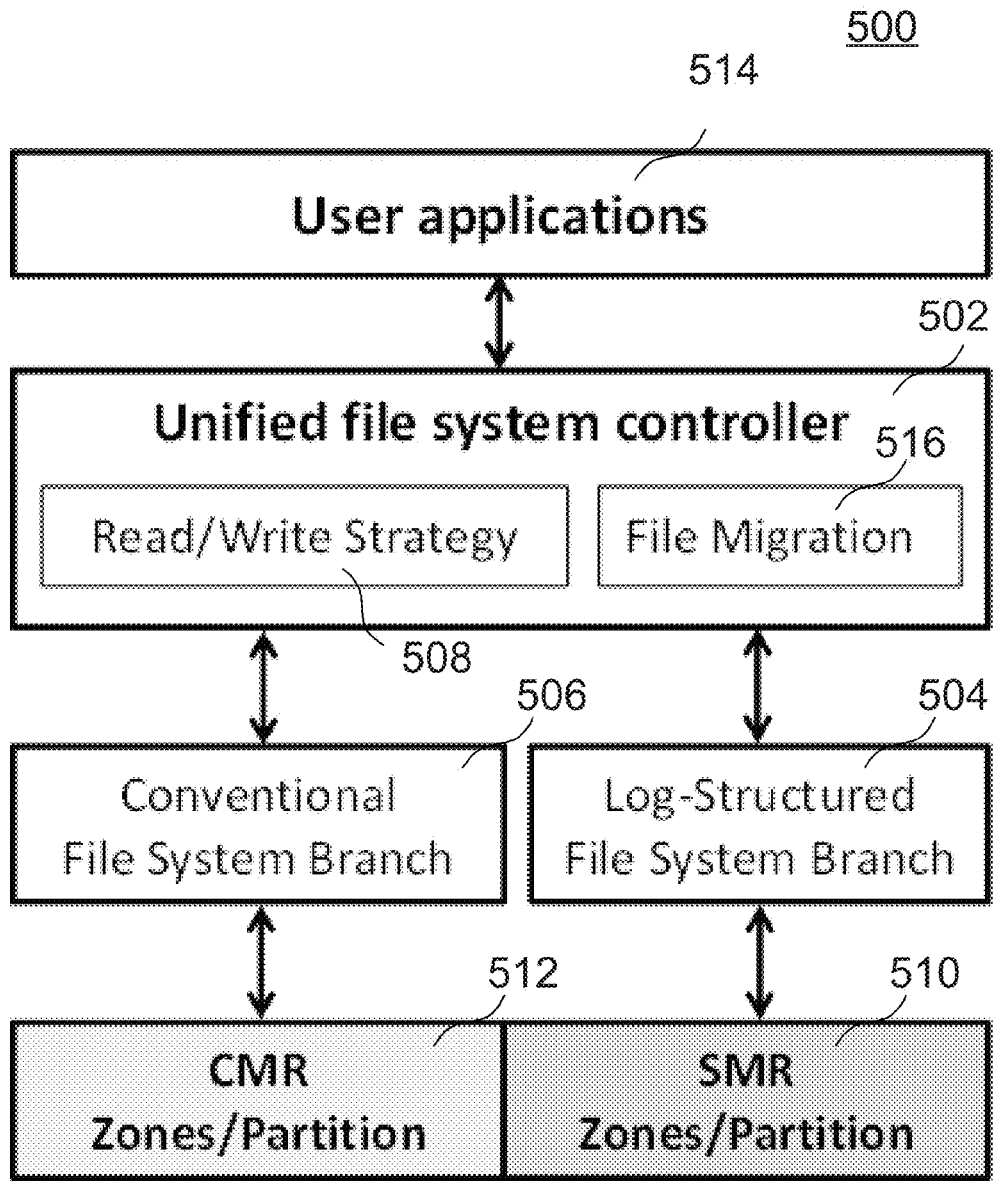
FIG. 5 shows a data storage system according to various embodiments.

FIG. 5 is a schematic 500 showing a data storage system according to various embodiments. The data storage system may include a unified system controller 502. The data storage system may include two independent file systems (i.e. a log-structured file system branch 504 and a conventional file system branch 506) controlled by the unified file controller 502. Each independent file system may control or access a portion of the storage. The unified file system controller include a read/write strategy module (or an access module) 508. The data storage system may include the log-structured file system branch 504 for controlling and/or accessing the first portion 510. The data storage system may include the conventional file system branch 506 for controlling and/or accessing the second portion 512. The log-structured file system branch 504 may be implemented by the first control sub-circuit. The conventional file system branch 506 may be implemented by the second control sub-circuit. The first control sub-circuit and the second control sub-circuit may form the control circuit. In other words, the log-structured file system branch 504 and the conventional file system branch 506 may be implemented by the control circuit. The read/write strategy module (or an access module) 508 may be implemented by a determination circuit.

The log-structured file system branch 504 may be configured to manage the data stored in the first portion, including metadata, index blocks, file data etc. The conventional file system branch 506 may be configured to manage the data stored in the second portion, including metadata, index blocks, file data etc. The conventional file system branch 506 may be or may include a general-purpose file system such as Ext 4.

The log-structured file system branch 504 may be configured to control writing the data to the first portion in a log structured manner. The log-structured file system branch 504 may be configured to control writing data in the form of a circular log in the first portion. The log may have a header and an end defining the data written to the first portion. The log-structured file system branch 504 may be further configured to append new data to the header of the log, the new data causing the header to move relative to the end.

The circular log may include a plurality of segments. The first portion may include a plurality of shingled magnetic recording zones. Each segment of the plurality of segments may correspond to one or more of the plurality of shingled magnetic recording zones. The log-structured file system branch 504 may be configured to control writing data to the first portion in the log structured manner include the log-structured file system branch 504 configured to control writing within each segment in a sequential manner.

The data storage system may include a marking circuit configured to mark unwanted old data on the first portion.

The data storage system may further include a selection circuit configured to select one segment out of the plurality of segments for writing of the new data over the old data. The selection circuit may be configured to select the one segment having the most amount of marked old data (invalid data). The log-structured file system branch 504 may be further configured to control writing of new data over old data by appending unmarked old data to the header and to remove marked old data within the selected one segment. The writing of new data over old data may be carried out sequentially within the selected one segment. The data storage system may include a garbage collector circuit to discard the marked old data or invalid data for freeing up occupied space.

The marking circuit, the selection circuit and/or the garbage collector circuit may implement a part of the log-structured file system branch 504 and/or the unified system controller 502.

The unified system controller 502 may be mounted and operated like a normal file system. The unified system controller 502 may be configured to provide a merged view of the two file system branches 504, 506 to the user level applications 514.

The unified controller 502 may be configured not to store any data including file data and file system metadata. The unified controller 502 may be configured as a dispatcher of incoming requests from the user level applications. The two file system branches 504, 506 may be configured to handle the file system operations.

The unified controller 502 may be configured to determine the read/write strategy of the data. The unified controller 502 may include a read/write strategy module (or determination circuit) 508. The read/write strategy module 508 may be configured to determine whether to write data to the first portion 510 or to the second portion 512. The read/write strategy module 508 may be further configured to determine whether to read from the first portion 510 or from the second portion 512.

For requests on an existing file such as reading or updating or deleting the file, the read/write strategy module 508 may be configured to determine whether to write/read the data to/from the first portion or to/from the second portion based on whether the file is located. For updating a file or deleting a file, the read/write strategy module 508 may be configured to write data to the first portion 510 or to the second portion 512 based on whether a relevant old data, i.e. the file to be deleted or updated, is located in the first portion 510 or the second portion 512. For request to create new files not already on the first portion 510 or the second portion 512, the read/write strategy module 508 may be configured to write to the first portion 510 by default. The first portion 510 may have a denser storage capacity and may also be efficient for newly appended writing.

The unified controller 502 may further include a file migration function 516. The file migration function 516 may be implemented by a file migration circuit.

The file migration function 516 may be configured to move data between the first portion 510 and the second portion 512. The unified controller may further include an access monitor for monitoring the access patterns of data stored in the first portion 510 and the second portion 512. The access monitor may be implemented by an access monitor control circuit. The file migration function 516 may be configured to move data between the first portion 510 and the second portion 512 based on the access patterns. The data storage system or access monitor may further include a hash table for recording the access pattern of the data, e.g. recording the access patterns and access frequency of the files at runtime. The hash table may be stored in a hash table memory in the data storage system or access monitor circuit.

The unified file system controller may be configured to make movement of data between the first portion 510 and the second portion 512 transparent to a user. In the namespace of the unified file system controller presented to the user, the pathname of a migrated file may remain unchanged after migration.

Figure 6A:
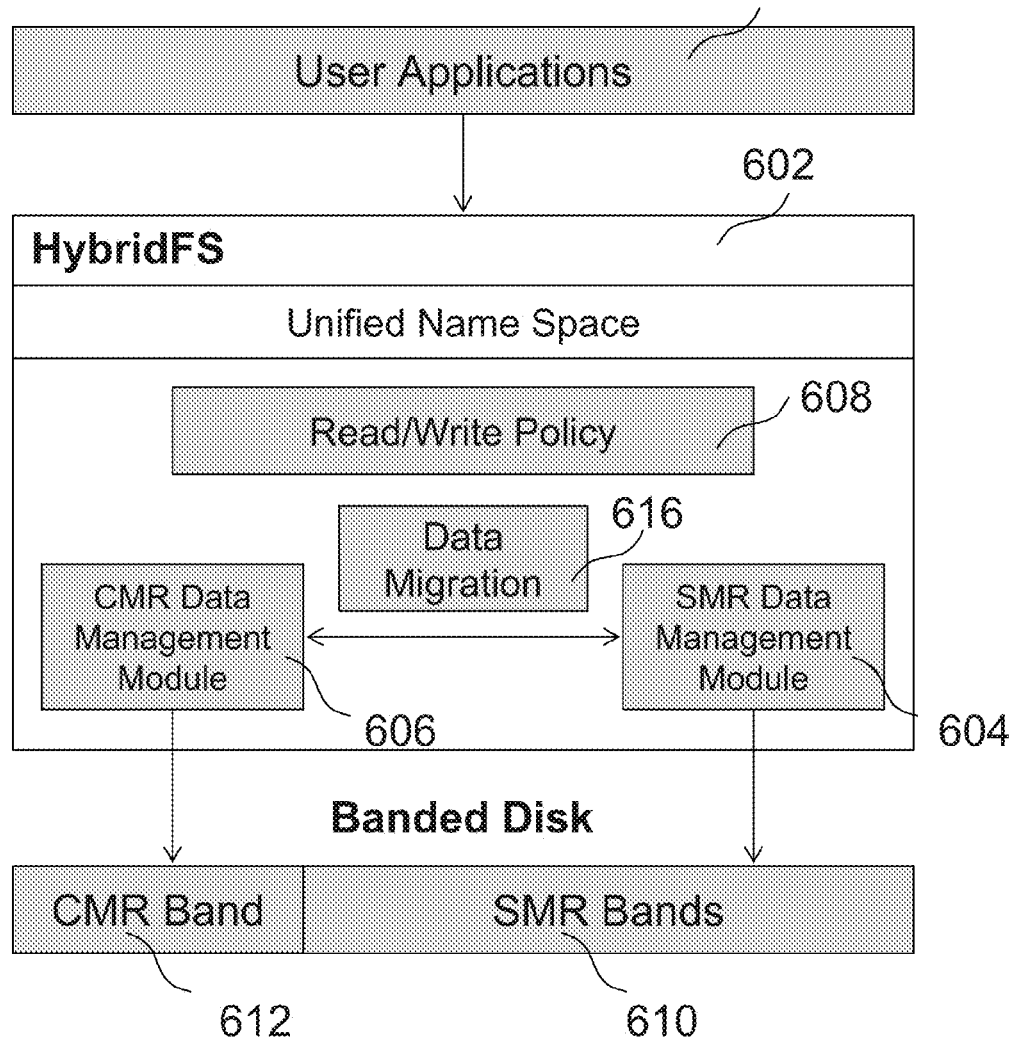
FIG. 6A shows a data storage system according to various embodiments

FIG. 6A is a schematic 600a showing a data storage system according to various embodiments. The data storage system may include a hybrid file system (HybridFS) 602. The hybrid file system 602 may include two management modules (i.e. a SMR management module 604 and a CMR management module 606) controlled by the hybrid file system 602. Each management module may control or access a portion of the storage. The hybrid file system 602 include a read/write policy module (or an access module) 608. The SMR management module 604 may be configured to control and/or access the first portion 610 including one or more SMR zones/bands. The CMR management module 606 may be configured to access the second portion 612 including one or more CMR zones/bands. In various embodiments, the SMR management module 604 may be implemented by a first control sub-circuit while the CMR management module 606 may be implemented by a second control sub-circuit. The second control sub-circuit may be electrically isolated from the first control sub-circuit or may be connected to the first control sub-circuit. The first control sub-circuit and the second control sub-circuit may form the control circuit. The read/write policy module (or an access module) 608 may be implemented by a determination circuit.

The SMR management module 604 may be configured to manage the data stored in the first portion, including metadata, index blocks, file data etc. The CMR management module 606 may be configured to manage the data stored in the second portion, including metadata, index blocks, file data etc.

The SMR management module 604 may be configured to control writing the data to the first portion in a log structured manner.

The hybrid file system 602 may be configured to provide an unified file name space to the user level applications 614 or users. The hybrid file system 602 may be further configured to provide standard and customized read/write interfaces to the user level applications 614 or users.

The hybrid file system 602 may be configured to determine the read/write strategy of the data. The hybrid file system 602 may include a read/write policy module 608. The read/write policy module 608 may be configured to determine whether to write data to the first portion 610 or to the second portion 612. The read/write policy module 608 may be further configured to determine whether to read from the first portion 610 or from the second portion 612. The read/write policy module 608 may be implemented by a determination circuit.

The hybrid file system 602 may further include a data migration module 616. The data migration module 616 may be implemented by a file migration circuit.

The file data migration module 616 may be configured to move data between the first portion 610 and the second portion 612. The unified file system controller may be configured to make movement of data between the first portion 610 and the second portion 612 transparent to a user.

Figure 6B:
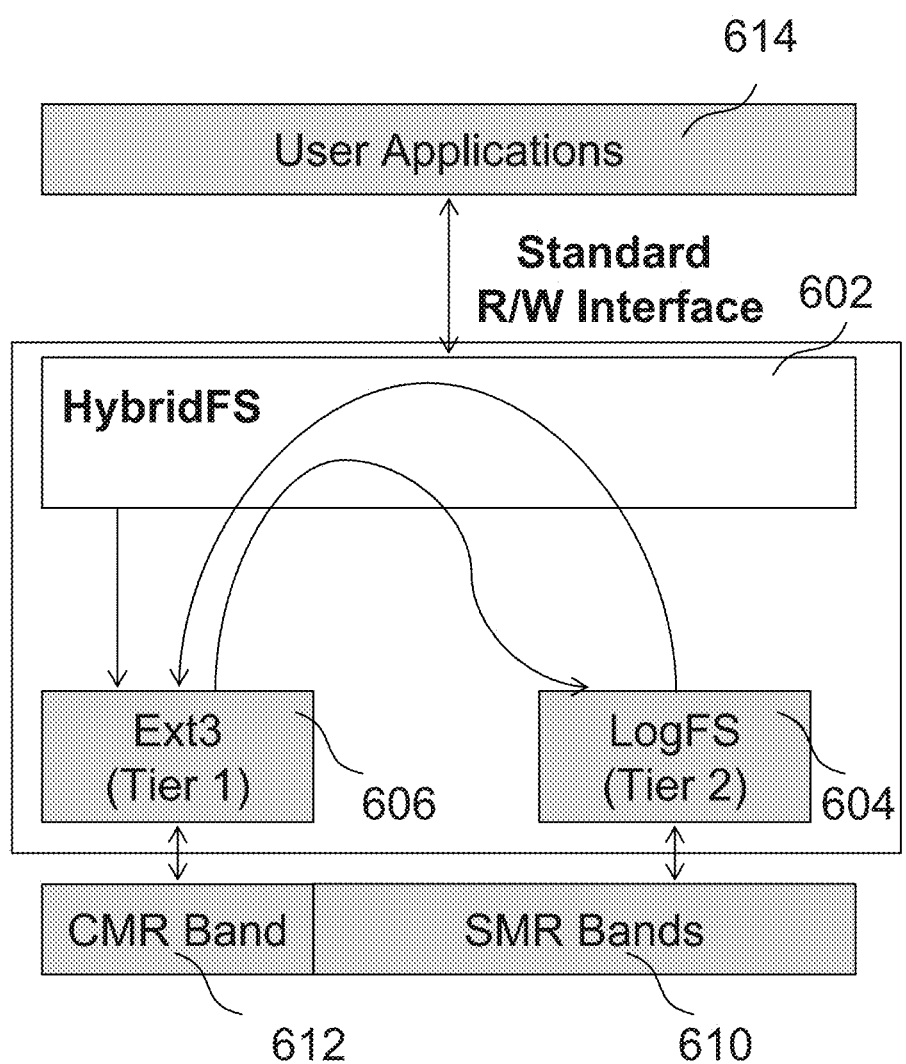
FIG. 6B shows the data storage system in FIG. 6A further configured according to various embodiments.

FIG. 6B is a schematic 600b showing the data storage system in FIG. 6A further configured according to various embodiments. In various embodiments, the SMR management module 604 may be configured to control writing data to the first portion 610 in a log structured manner. The SMR management module 604 may be termed as the Log File System (LogFS). The CMR management module 606 may be configured to control writing data to the second portion 612 in a random access manner. The CMR management module 606 may be Ext3. According to various embodiments, the read/write policy module 608 configured to determine whether to write data to the first portion 610 or to the second portion 612 may include the read/write policy module 608 configured to determine whether to write data to the first portion 610 or to the second portion 612 based on whether a relevant old data is located in the first portion 610 or the second portion 612.

If there is relevant old data located in the first portion 610 such as when deleting/modifying a file located in the first portion 610, the read/write policy module 608 may be configured to write the data to the location where the old data is located, on the first portion 610. In various embodiments, the unwanted old data may be discarded and the data may be sequentially appended as new data. The wanted old data may be appended as new data in the first portion.

In the event that relevant old data is located in the second portion 612 such as when deleting/modifying a file located in the second portion 612, the read/write policy module 608 may also be configured to write the data to the location where the old data is located on the second portion 612. As the data is written in random access mode, the wanted old data may not be overwritten by the new data and the unwanted old data may be directly overwritten with the new data.

The file data migration module 616 may be configured to move data between the first portion 610 and the second portion 612. Big files and cold files may be moved or migrated to the first portion while hot files may be moved or migrated to the second portion.

If there is no relevant old data located in the first portion or the second portion, the read/write policy module 608 may be configured to write data to the first portion by default.

FIG. 6C is a schematic 600c showing the data storage system in FIG. 6A further configured according to various embodiments. In various embodiments, the read/write policy module 608 configured to determine whether to write data to the first portion 610 or to the second portion 612 may include the read/write policy module 608 configured to determine whether to write data to the first portion 610 or to the second portion 612 based on information received from user applications 614.

The hybrid file system 602 may be configured to provide customized write interface in which the user applications 614 may provide information on whether to write to the first portion 610 or to the second portion 612. The user applications 614 may obtain the information from a Key Value (KV) Index Table 618. The Key Value Index Table 618 may be an indexing structure in which the keys and values are grouped in pairs (Key-Value pairs). The Key-Value pairs may be placed in the indexing structure according to a certain order (e.g. hash) of the keys. An user application may search for a key and match it to a value corresponding to the key. In various embodiments, the data storage system may include a File-To-Band/Block Translation Layer 620. The File-To-Band/Block Translation Layer 620 may be configured to control writing the data to the first portion in a log structure manner. When a file in the first portion 610 is updated, the File-To-Band/Block Translation Layer 620 may be configured to write the data to the location where the old data is located on the first portion 610. The marked old data (unwanted data or invalid data) may be overwritten with new data. The unmarked old data (wanted data) may be appended as new data and the unmarked old data subsequently overwritten with new data. Free space may be reclaimed through the writing of data on the old data. The File-To-Band/Block Translation Layer 620 may be implemented by the determination circuit and/or the control circuit. In various embodiments, the data storage system may be a cloud storage system.

Figure 7A:
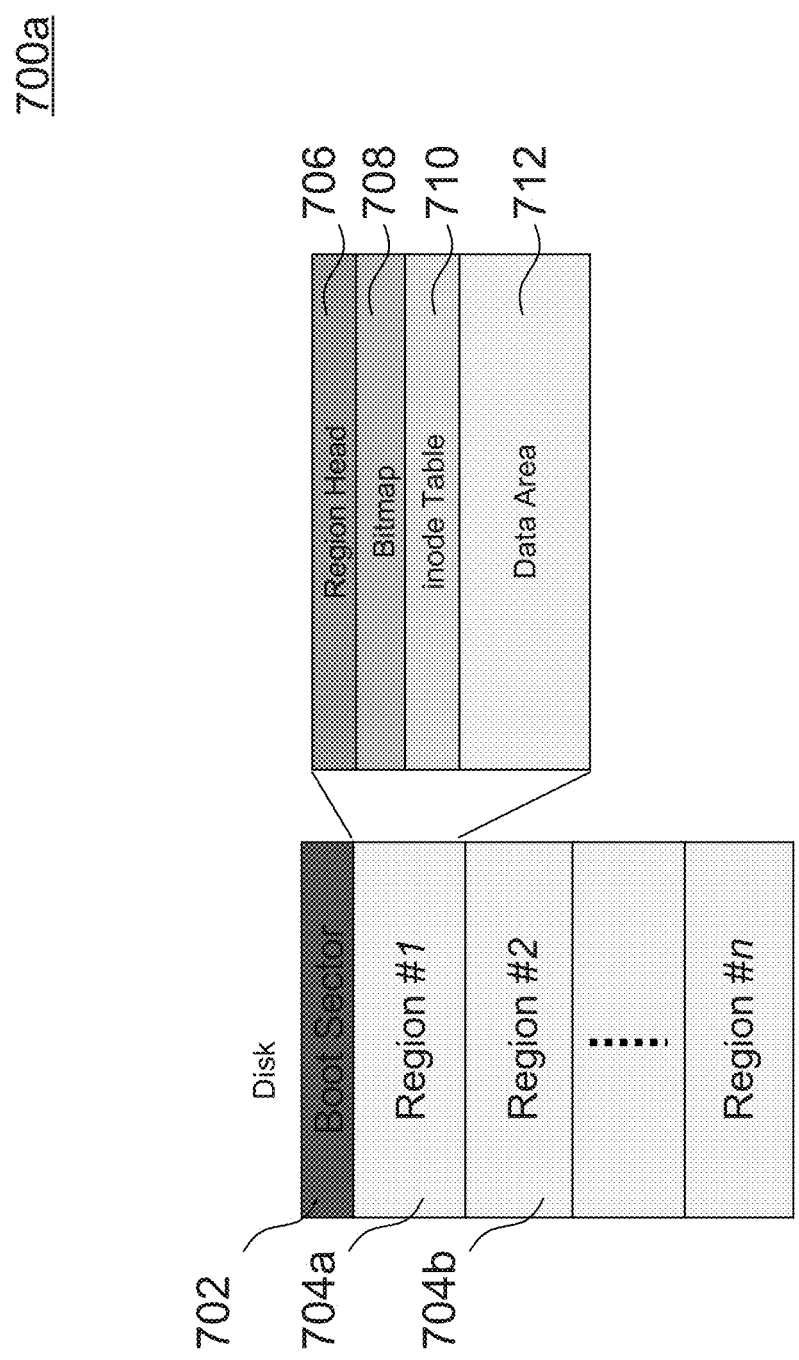
FIG. 7A shows how data is stored in a hard disk.

FIG. 7A shows a schematic 700a showing how data is stored in a hard disk. The hard disk may include a boot sector 702 including data for initializing a program such as an operating system. The remaining area in the hard disk may be divided into regions 704a, 704b etc. Each region may include a region head 706, a bit map 708, an inode table 710 and a data area 712. The region head 706, bit map 708 and inode table 710 are metadata. Writing data onto a hard disk may include allocating space by looking up the bit map 708, writing data to the data area 712, updating the inode table 710 and updating the bit map 708. File system metadata may include the region head 706, bit map 708 and the inode table 710. File data may include the data area 712. A write operation typically involves accessing file system metadata multiple times.

Figure 7B:
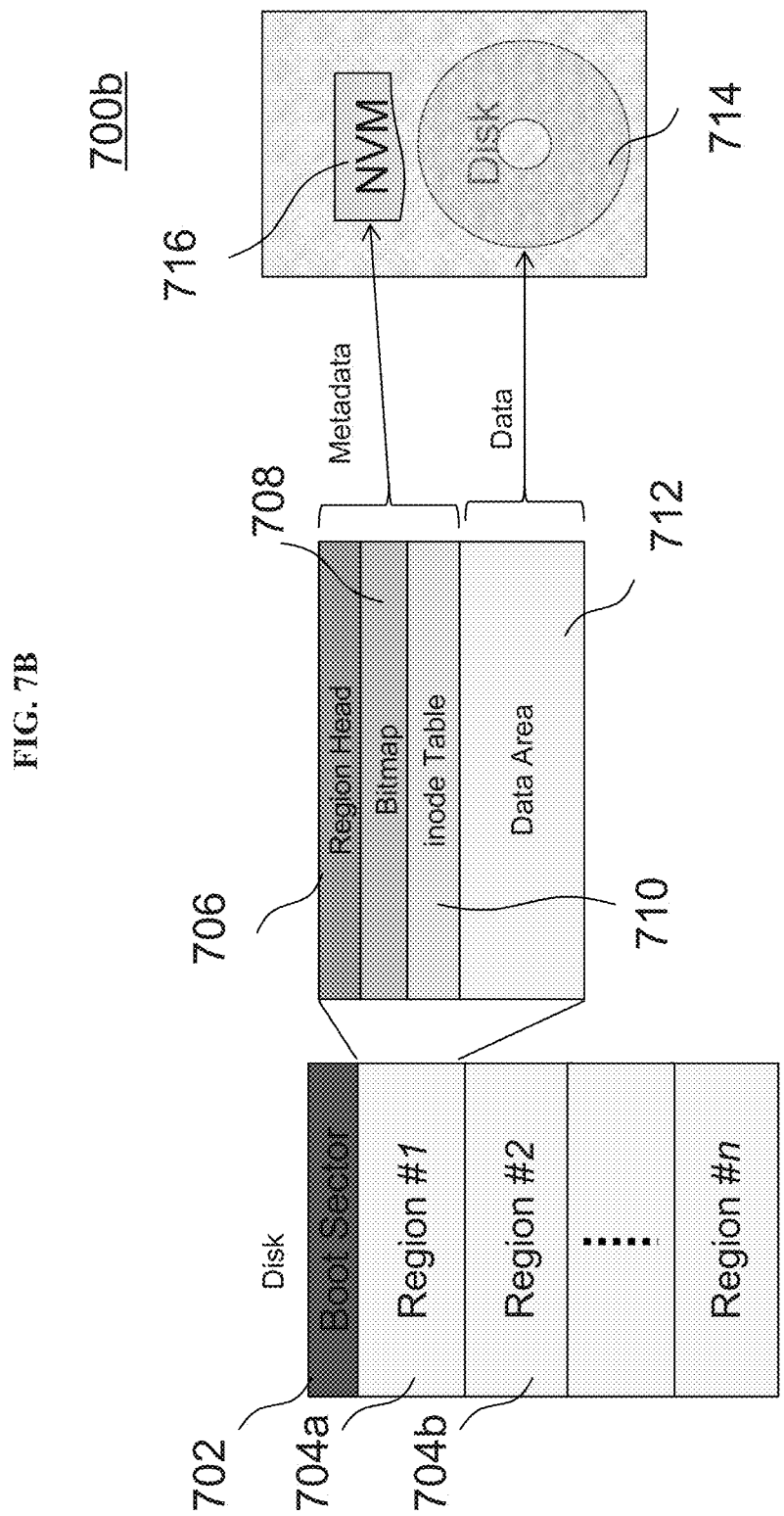
FIG. 7B shows how data may be written to a storage according to various embodiments, the storage including a first portion and a second portion.

FIG. 7B shows a schematic 700b showing how data may be written to a storage including a first portion 714 and a second portion 716 according to various embodiments. The first portion 714 may include a hard disk while the second portion 716 may include a non-volatile memory. The second portion 716 may be configured to store file system metadata. The first portion 714 may be configured to store file data. As the frequently accessed file system metadata is stored in the non-volatile, overall speed of writing may be increased.

Figure 8A:
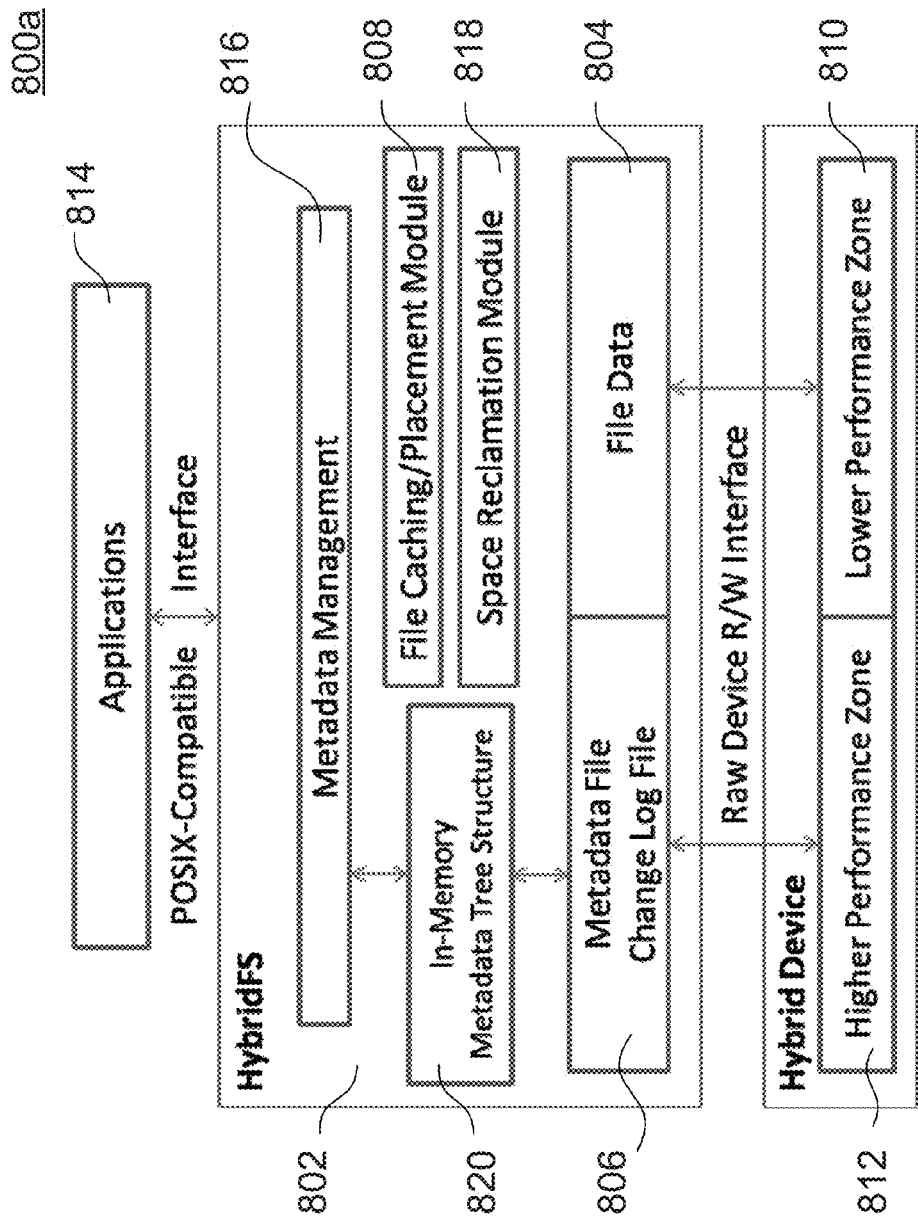
FIG. 8A shows a data storage system according to various embodiments

FIG. 8A is a schematic 800a showing a data storage system according to various embodiments. The data storage system may include a hybrid file system (HybridFS) 802. The hybrid file system 802 may include a file data module 804 configured to control writing the data to a first portion (i.e. lower performance zone) 810 in a log structured manner. The file data module 804 may be implemented by a first control sub-circuit. The hybrid file system 802 may further include a metadata file/change log file module 806 configured to control writing to a second portion (i.e. higher performance zone) 812 in a random access manner. In various alternate embodiments, the hybrid file system 802 may further include a metadata file/change log file module 806 configured to control writing to a second portion (i.e. higher performance zone) 812 in a log structure manner. The metadata file/change log file module 806 may be implemented by a second control sub-circuit. The second control sub-circuit may be electrically isolated from the first control sub-circuit or may be connected to the first control sub-circuit. The hybrid file system 802 may include a file caching/placement module 808 configured to determine whether to write data to the first portion or to the second portion. The file caching/placement module 808 may be implemented by a determination circuit. Additionally, a metadata management module 816 may alternatively or additionally be implemented by the determination circuit. In various embodiments, the metadata management module 816 may at least be partially be implemented by the control circuit. In various embodiments, the hybrid file system 802 may be further configured to write data to one or more subsequent portions.

In various embodiments, the hybrid file system 802 may be configured to provide user applications 814 with a standard portable operating system interface (POSIX)-Compatible interface. The hybrid system 802 may be developed based on the file system in user space (FUSE) framework.

In various embodiments, the file caching/placement module 808 and/or the metadata management module 816 may be configured to determine whether the data is file data or file system metadata. The file caching/placement module 808 and/or the metadata management module 816 may be configured to determine to write data to the first portion if the data is file data. The file caching/placement module 808 and/or the metadata management module 816 may be configured to determine to write data to the second portion if the data is file system metadata. File data and system metadata usually exhibit different access patterns. File system metadata may draw smaller and more random requests while file data is accessed less often with sequential requests. The file caching/placement module 808 and/or the metadata management module 816 may be configured to determine to write data to the first portion 810 (i.e. lower performance zone) if the data is file data, which is accessed sequentially and/or less frequently. On the other hand, the file caching/placement module 808 and/or the metadata management module 816 may be configured to determine to write data to the second portion 812 (i.e. higher performance zone) if the data is file system metadata, which is accessed more frequently and/or more likely to be accessed randomly.

In various embodiments, the hybrid file system 802 may include a in-memory metadata tree structure. The in-memory metadata tree structure may be implemented by a memory (metadata memory) configured to store the metadata tree structure. The memory may be a dynamic random access memory (DRAM). The memory may include one or more hash tables for speeding up metadata search operations.

Figure 9:
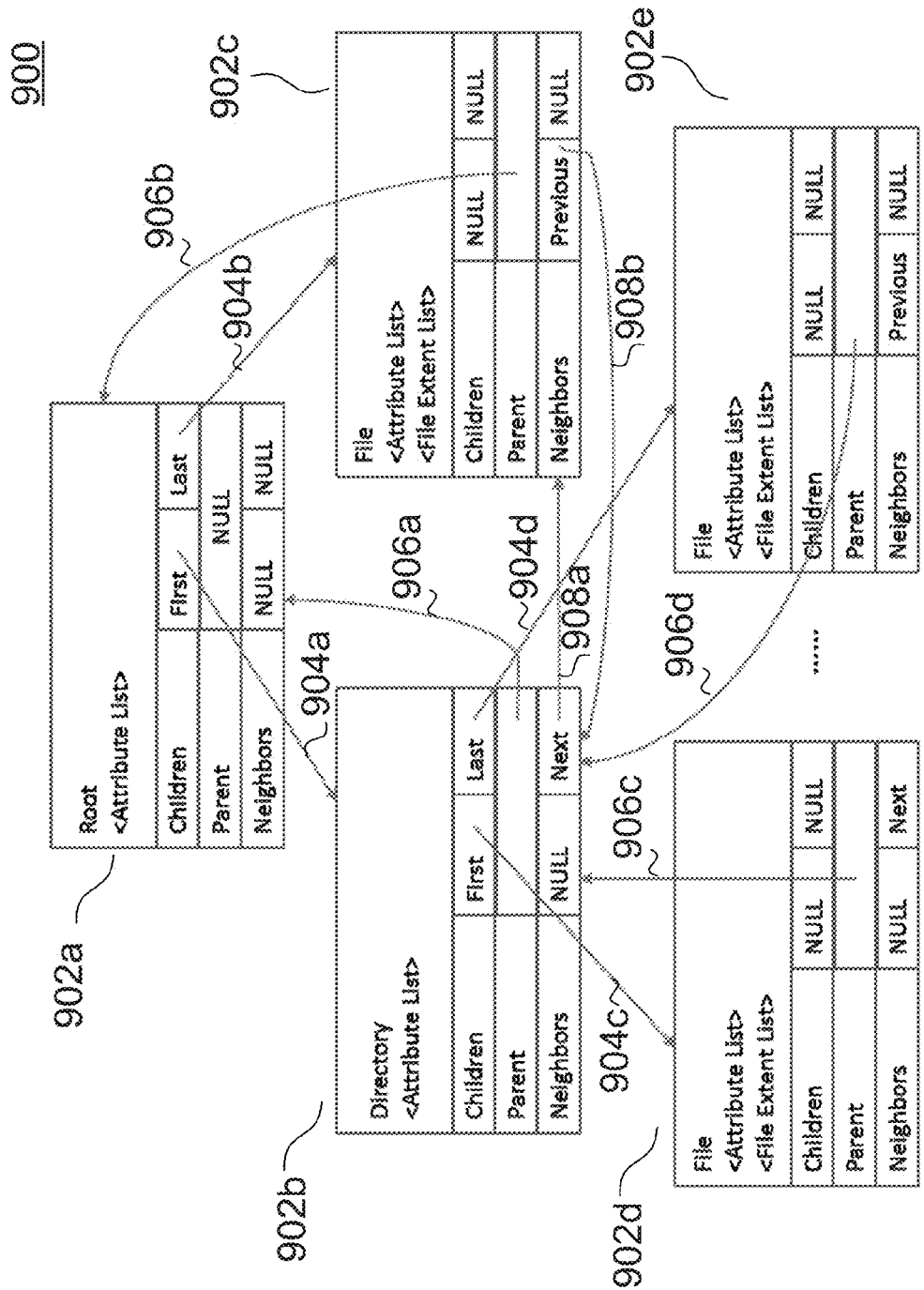
FIG. 9 shows a tree structure according to various embodiments.

FIG. 9 shows a schematic 900 of a tree structure according to various embodiments. The tree structure may include a plurality of nodes 902a, 902b, 902c, 902d, 902e etc. Starting from the root directory, each file or directory stored in the storage may be allocated one node of the plurality of nodes 902a, 902b, 902c, 902d, 902e etc. in the tree structure. Each node may include an attribute list. The attribute list may include attributes of the file or directory such as size, last access time and date, last modified time and date etc. The file may be a data file. If the node pertains to a file, the node may include a file extent list for indicating where the data of the file is stored in the storage. For example, node 902a pertains to the root directory. Node 902b pertains to a directory and nodes 902c, 902d and 902e pertains to files.

The plurality of nodes 902a, 902b, 902c, 902d, 902e may be connected to one another using pointers 904a, 904b, 904c, 904d, 906a, 906b, 906c, 906d, 908a, 908b. Each of the plurality of pointers 902a, 902b, 902c, 902d, 902e may be one of children, parent or neighbour pointers. For instance, for node 902a, children pointers 904a, 904b may point to nodes 902b and nodes 902c for indicating the directory pertaining to node 902b or the file pertaining to node 902c are children of the root directory in node 902a. Parent pointers 906a, 906b in nodes 902b and 902c respectively, point to node 902a. Children pointers 904c, 904d in node 902b may point to nodes 902d and 902e respectively, indicating that the files stored in node 902d and 902e. are daughters to the directory stored on node 902b. Parents pointers 906c, 906d in nodes 902d and 902e respectively, point to node 902b. Neighbour pointer 908a in node 902b points to node 902c while neighbour pointer 908b in node 902c point to 902b, indicating that the directory in node 902b and the file in 902c are neighbours.

The metadata file/change log file module 806 and/or the metadata management module 816 may be configured to write file system metadata in the memory to the second portion 812 at periodic intervals. The system metadata may be written to the second portion 812 in a metadata file. The information in the tree structure may be synchronized to the metadata file stored in the second portion 812 at periodic intervals. Metadata change operations may be recorded to a log file in the second portion 812 for preventing metadata losses between synchronization intervals.

The first portion may include a plurality of bands or segments. Each band or segment may include a plurality of shingled or overlapping tracks. The file data module 804 and/or the metadata management module 816 may be configured to control writing the data to each band in the first portion in a log structured manner. Writing the data to each band in a log structured manner may include writing data, whether there is a relevant old data or not, in a sequential appending manner. Writing in a log structured manner may have improved performance compared to writing in a random access manner on storage medias such as magnetic disks and flash memories. Also, shingled magnetic recording zones may only be written in a log structured manner or sequentially due to the overlapping tracks. On the other hand, the metadata file/change log file module 806 and/or the metadata management module 816 may be configured to control writing to a second portion (i.e. higher performance zone) 812 in either a log structured manner or a random access manner.

In various embodiments, the file data module 804 and/or the metadata management module 816 may be configured to control writing data to the first portion 810 in the log structured manner. Controlling writing to the first portion 810 in the log structured manner may include controlling writing data in the form of a circular log in the first portion 810, the log having a header and an end defining the data written to the first portion 810. The file data module 804 and/or the metadata management module 816 may be further configured to append new data to the header of the log, the new data causing the header to move relative to the end. In various embodiments, the file data module 804 and/or the metadata management module 816 may be configured to control writing data to the first portion 810 using the band/segment based approach. Controlling writing to the first portion 810 using the band/segment based approach may include controlling writing data in the form of one or more bands/segments in the first portion 810. Controlling writing to the first portion 810 using the band/segment based approach may include selecting one segment/band of the one or more segments/bands in the first portion 810. Controlling writing to the first portion 810 using the band/segment based approach may further include controlling writing data to the selected band/segment of the one or more bands in the first portion 810. The file data module 804 and/or the metadata management module 816 may be further configured to append new data to the appending pointer/header.

The hybrid file system 802 may further include a space reclamation module 818 for freeing up space by discarding the unwanted old data. The unwanted old data may be data stored in the storage deleted or replaced with updated data by the user or user applications 814. The space reclamation module 818 may be implemented by a garbage collector circuit and/or a space reclamation circuit.

In various embodiments, the space reclamation module 818 may be configured to delete/modify old data using a file-based approach. The space reclamation module 818 may be configured to write all wanted files stored on the storage as new data. The wanted files may include all files, excluding files deleted or replaced with updated data by the user or user applications 814. The new data may be written by appending to the header of the circular log in a sequential manner. In various embodiments, the new data may be written by appending to the appending pointer/header. The old data, including the old data of the unwanted files and the old data of the wanted files, are overwritten by the new data.

In various alternate embodiments, the space reclamation module 818 may be configured to delete/modify old data using a band-based approach. The first portion 810 may include one or more bands/segments. Each band/segment may include a plurality of shingled or overlapping tracks. The space reclamation module 818 may be configured to select one or more bands/segments for space reclamation. The wanted old data in the selected band/segment may be appended to the appending pointer/header of another band/segment of the one or more bands/segments as new data and the old data, including the wanted old data and the unwanted old data, are overwritten by the new data.

In various embodiments, metadata file/change log file module 806 and/or the metadata management module 816 may be configured to control writing data to the second portion 812 in the log structured manner. Controlling writing to the second portion 812 in the log structured manner may include controlling writing data in the form of a circular log in the second portion 812, the log having a header and an end defining the data written to the second portion 812. The metadata file/change log file module 806 and/or the metadata management module 816 may be further configured to append new data to the header of the log, the new data causing the header to move relative to the end. In various embodiments, metadata file/change file module 806 and/or the metadata management module 816 may be configured to control writing data to the second portion 812 using the band/segment approach. Controlling writing to the second portion 812 using the band/segment approach may include controlling writing data in the form of one or more bands/segments in the second portion 812. The metadata file/change log file module 806 and/or the metadata management module 816 may be further configured to append new data to the appending pointer/header.

The file caching/placement module 808 and/or the metadata management module 816 may be configured to control writing the data to the second portion 812 in a log structured manner even if the data is file data based on further considerations. The further considerations may include popularity of the data/file and file size. The more popular data/file may be accessed more often and may be determined to be stored/cached in the second portion (higher performance zone) 812. Files having small file sizes may be stored/cached in the second portion 812 to reduce small random access to the first portion (lower performance zone) 810.

Figure 8B:
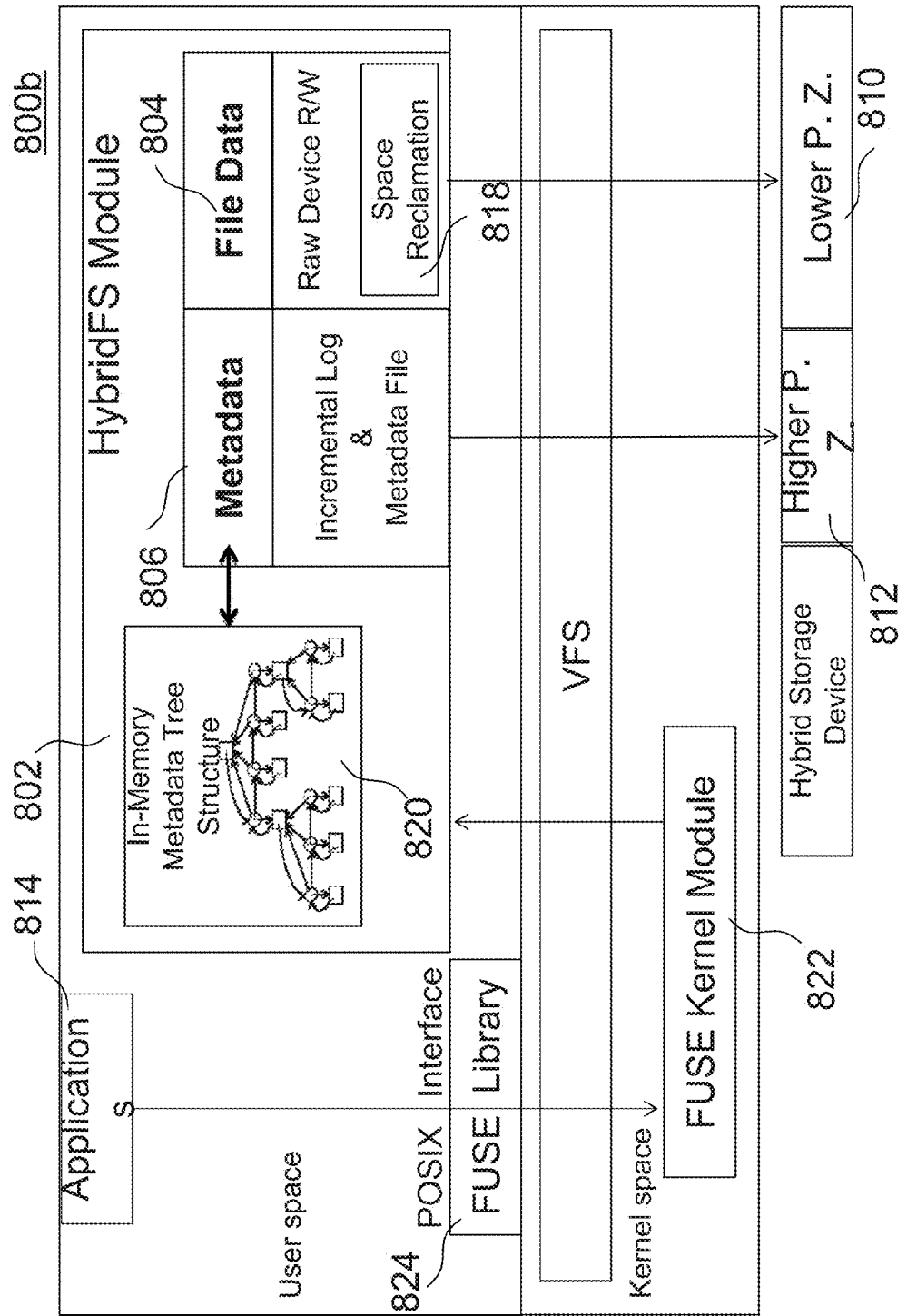
FIG. 8B shows a data storage system according to various embodiments.

FIG. 8B is a schematic 800b showing a data storage system according to various embodiments. The hybrid file system 802 may be implemented as a user-level file system based on the FUSE framework. The hybrid file system 802 may further provide the standard POSIX interfaces to the user applications. The user applications 814 may communicate with the hybrid file system 802 through a FUSE kernel module 822 using FUSE library 824. The FUSE kernel module 822 may be in kernel space. The hybrid file system 802 may be configured to determine whether to write data to the first portion 810 or to the second portion 812. The hybrid file system 802 may be configured to determine whether the data is file data or file system metadata. The hybrid file system 802 may be further configured write data to the first portion 810 (through file data module 804) if the hybrid file system 802 determines the data is file data and to write data to the second portion 812 (through metadata module 806) if the hybrid file system 802 determines the data is file system metadata. The file data module 804 may be configured to control writing to the first portion 810 in a log structured manner via a raw device read/write interface. The space reclamation module 818 may reside in the file data module 804.

Figure 8C:
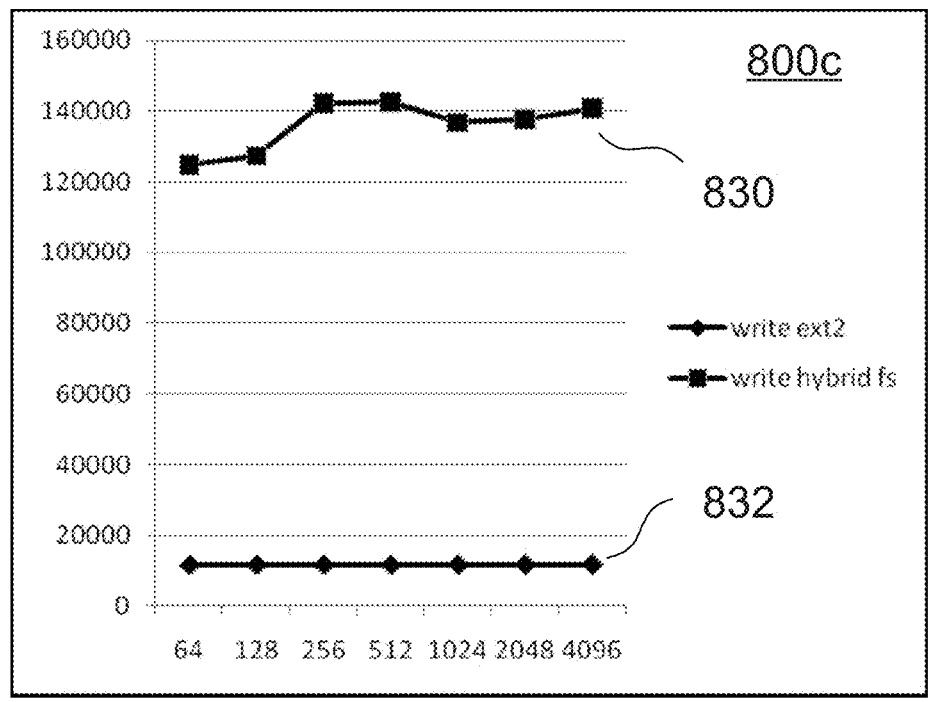
FIG. 8C is a graph of file system throughput (in kilobytes or kB) against file request size (in kilobytes or kB) showing the write performance of the hybrid system in FIG. 8B according to various embodiments against Ext2 file system.
Figure 8D:
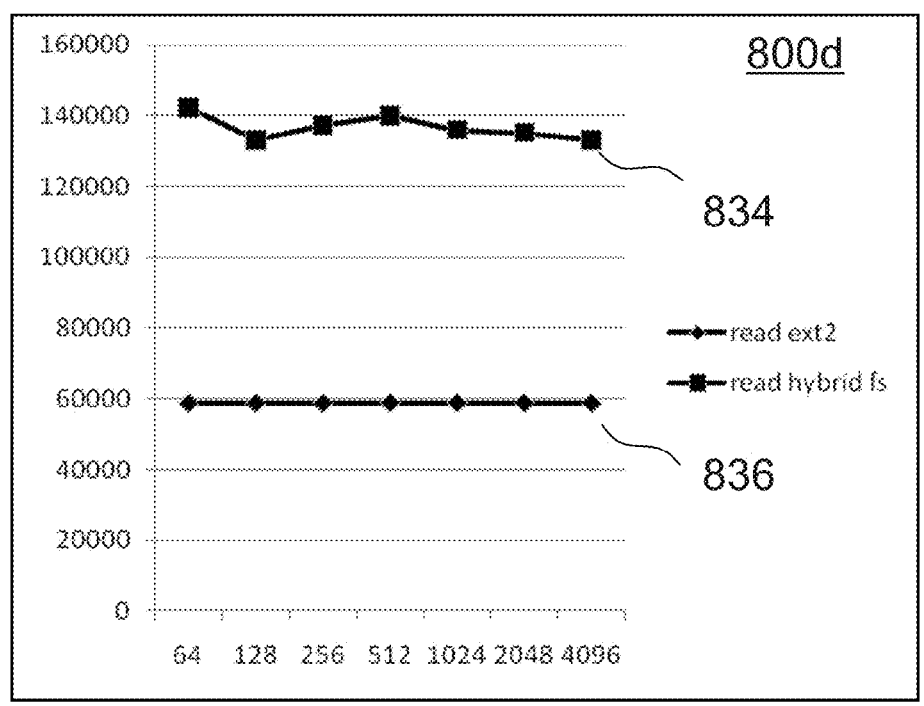
FIG. 8D is a graph of file system throughput (in kilobytes or kB) against file request size (in kilobytes or kB) showing the read performance of the hybrid system in FIG. 8B according to various embodiments against Ext2 file system.

FIG. 8C is a graph 800c of file system throughput (in kilobytes or kB) against file request size (in kilobytes or kB) showing the write performance of the hybrid system in FIG. 8B according to various embodiments against Ext2 file system. FIG. 8D is a graph 800d of file system throughput (in kilobytes or kB) against file request size (in kilobytes or kB) showing the read performance of the hybrid system in FIG. 8B according to various embodiments against Ext2 file system. The hybrid system is used to write/read data to/from a hybrid drive, the hybrid drive including a HDD and a SSD. The Ext2 file system use used to write/read data to/from a HDD. The same operating system is used for both file systems. The line 830 pertaining to the write performance of the hybrid file system is above the line 832 pertaining to the write performance of the Ext 2 file system, showing the hybrid file system has better performance over the Ext 2 file system across all file request sizes. Similarly, the line 834 pertaining to the read performance of the hybrid file system is above the line 836 pertaining to the read performance of the Ext 2 file system, showing the hybrid file system has better performance over the Ext 2 file system across all file request sizes.

Figure 8E:
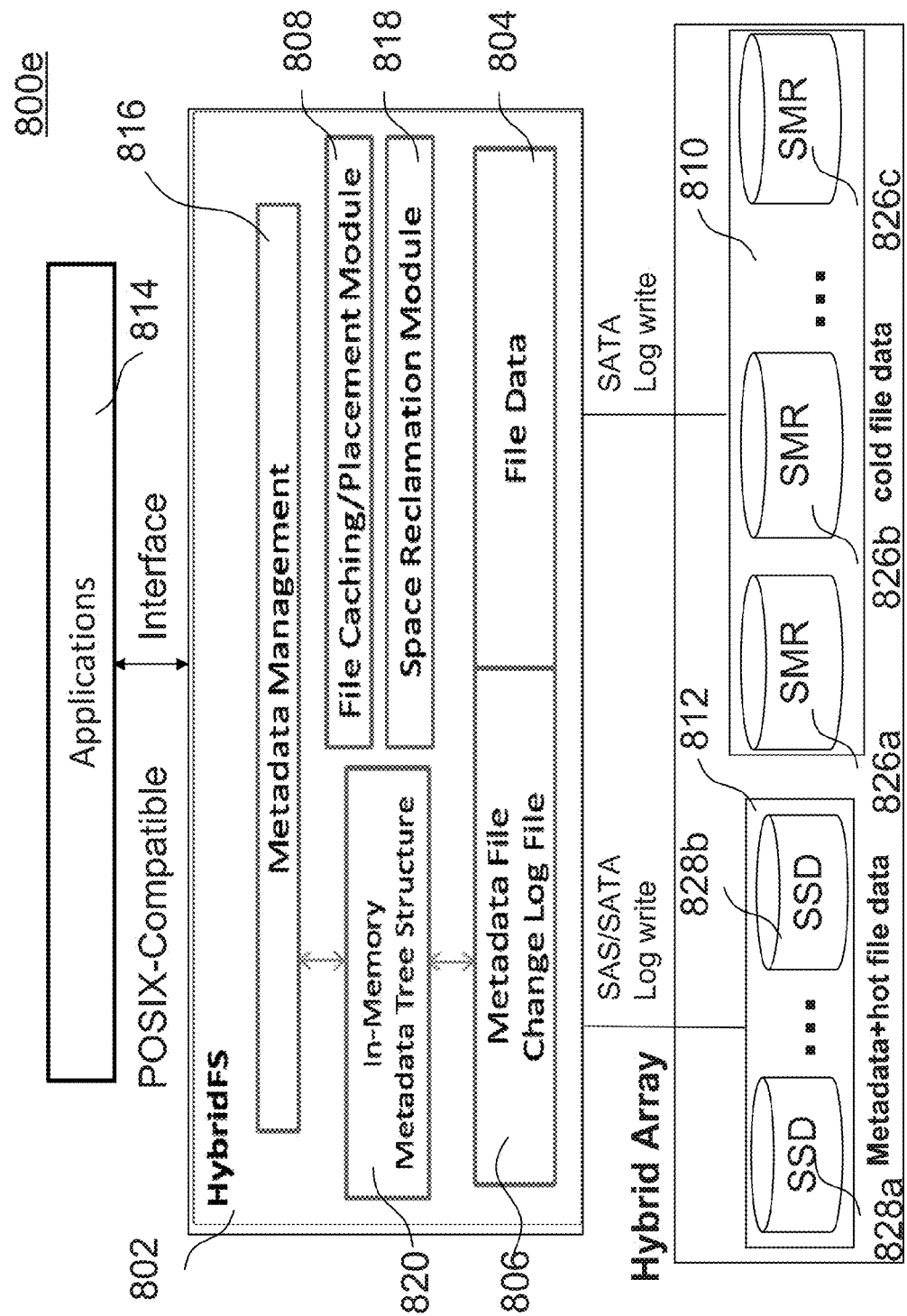
FIG. 8E illustrates the data storage system shown in FIG. 8A according to various embodiments coupled to a hybrid array.

FIG. 8E is a schematic 800e showing a data storage system shown in FIG. 8A according to various embodiments coupled to a hybrid array. The hybrid array may include a plurality of shingled magnetic recording (SMR) drives 826a, 826b, 826c etc. Shingled magnetic recording (SMR) drives may also be referred to as shingled writing disks. The hybrid array may further a plurality of solid state drives (SSDs) 828a, 828b etc. Each of the plurality of shingled magnetic recording (SMR) drives 826a, 826b, 826c etc. may include one or more SMR zones. Each of the plurality of solid state drives (SSDs) 828a, 828b etc. may include one or more memory zones. The plurality of shingled magnetic recording (SMR) drives 826a, 826b, 826c etc. may form the first portion 810. The plurality of solid state drives (SSDs) 828a, 828b etc. may form the second portion 812. In other words, the first portion 810 may include the SMR zones of the plurality of SMR drives 826a, 826b, 826c etc. while the second portion 812 may include the memory zones of the SSDs 828a, 828b etc. The memory zones of the SSDs may include flash memory. The first portion 810 may be configured to store cold file data while the second portion 812 may be configured to store file system metadata as well as hot file data. The storage may further include an array circuit coupled or connected to the plurality of SMR drives 826a, 826b, 826c etc. and the plurality of SSDs 828a, 828b etc. The plurality of SMR drives 826a, 826b, 826c etc. and the plurality of SSDs 828a, 828b etc. may be controlled by the array circuit. The hybrid array may be configured as a high performance, high capacity and low cost storage array for cloud and/or backup. The plurality of SMR drives does not require a shingled translation layer (STL). A STL remaps in-place update to different locations and writes the data through appending but may incur delay in response time and may have negative impact on the disk performance. The plurality of SMR drives may instead by configured as a RAID array. In various embodiments, the data storage system may include the storage, i,e, the hybrid array.

Figure 8F:
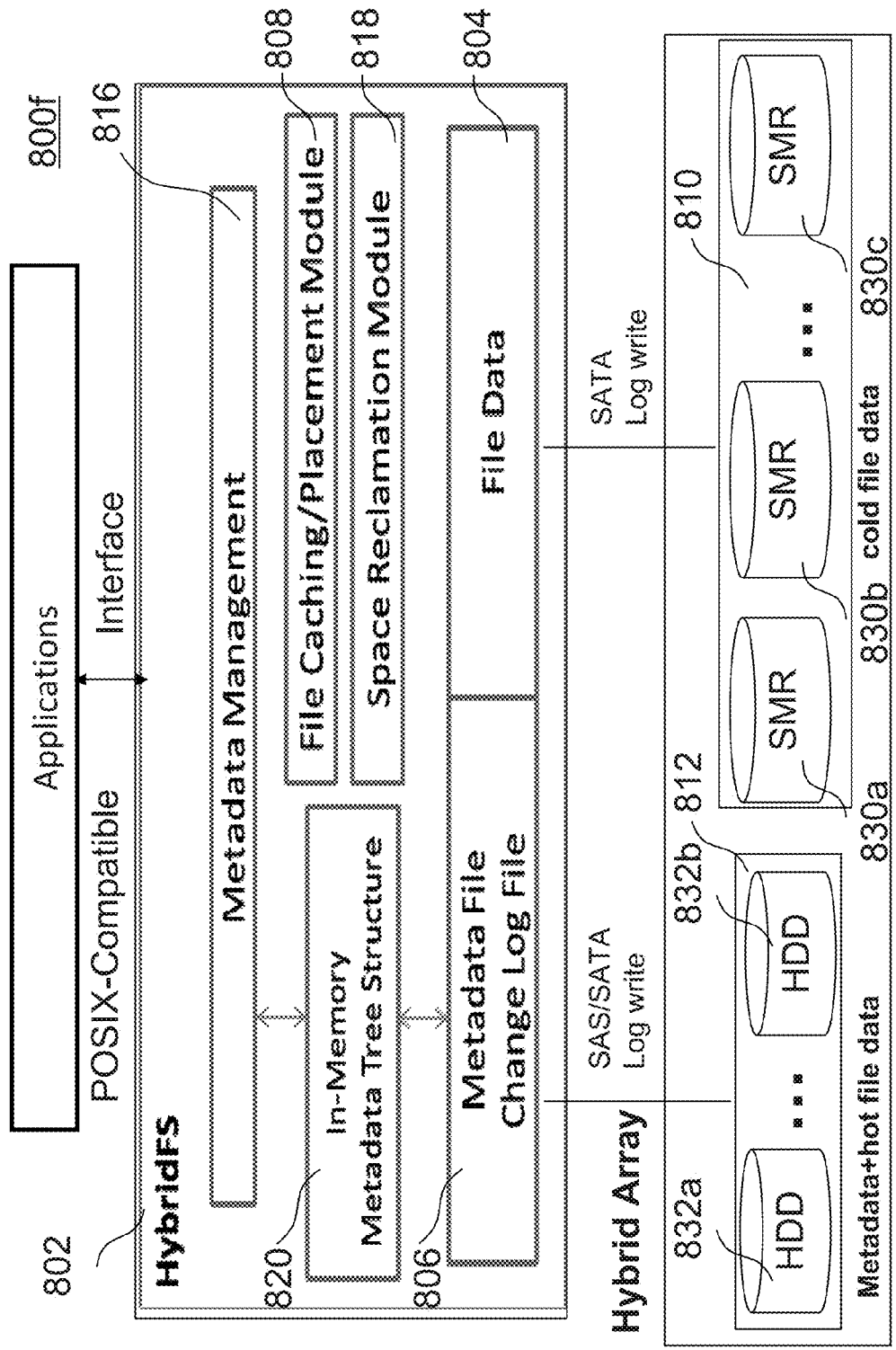
FIG. 8F illustrates a data storage system shown in FIG. 8A according to various embodiments coupled to a hybrid array.

FIG. 8F is a schematic 800f showing a data storage system shown in FIG. 8A according to various embodiments coupled to a hybrid array. The hybrid array may include a plurality of shingled magnetic recording (SMR) drives 830a, 830b, 830c etc. The hybrid array may further a plurality of hard disk drives (HDDs) 832a, 832b etc. Each of the plurality of shingled magnetic recording (SMR) drives 830a, 830b, 830c etc. may include one or more SMR zones. Each of the plurality of hard disk drives (HDDs) 832a, 832b may include conventional magnetic recording (CMR) zones. The plurality of shingled magnetic recording (SMR) drives 830a, 830b, 830c etc. may form the first portion 810. The plurality of hard disk drives (HDDs) 832a, 832b etc. may form the second portion 812. In other words, the first portion 810 may include the SMR zones of the plurality of SMR drives 830a, 830b, 830c etc. while the second portion 812 may include the CMR zones of the HDDs 832a, 832b etc. The first portion 810 may be configured to store cold file data while the second portion 812 may be configured to store file system metadata as well as hot file data. The storage may further include an array circuit coupled or connected to the plurality of SMR drives 830a, 830b, 830c etc. and the plurality of SSDs 832a, 832b etc. The plurality of SMR drives 830a, 830b, 830c etc. and the plurality of SSDs 832a, 832b etc. may be controlled by the array circuit. The hybrid storage may be configured as a cost effective solution for cloud and archival. The hybrid array may not require a STL. The hybrid array may be configured as a RAID array. In various embodiments, the data storage system may include the storage, i,e, the hybrid array.

Figure 8G:
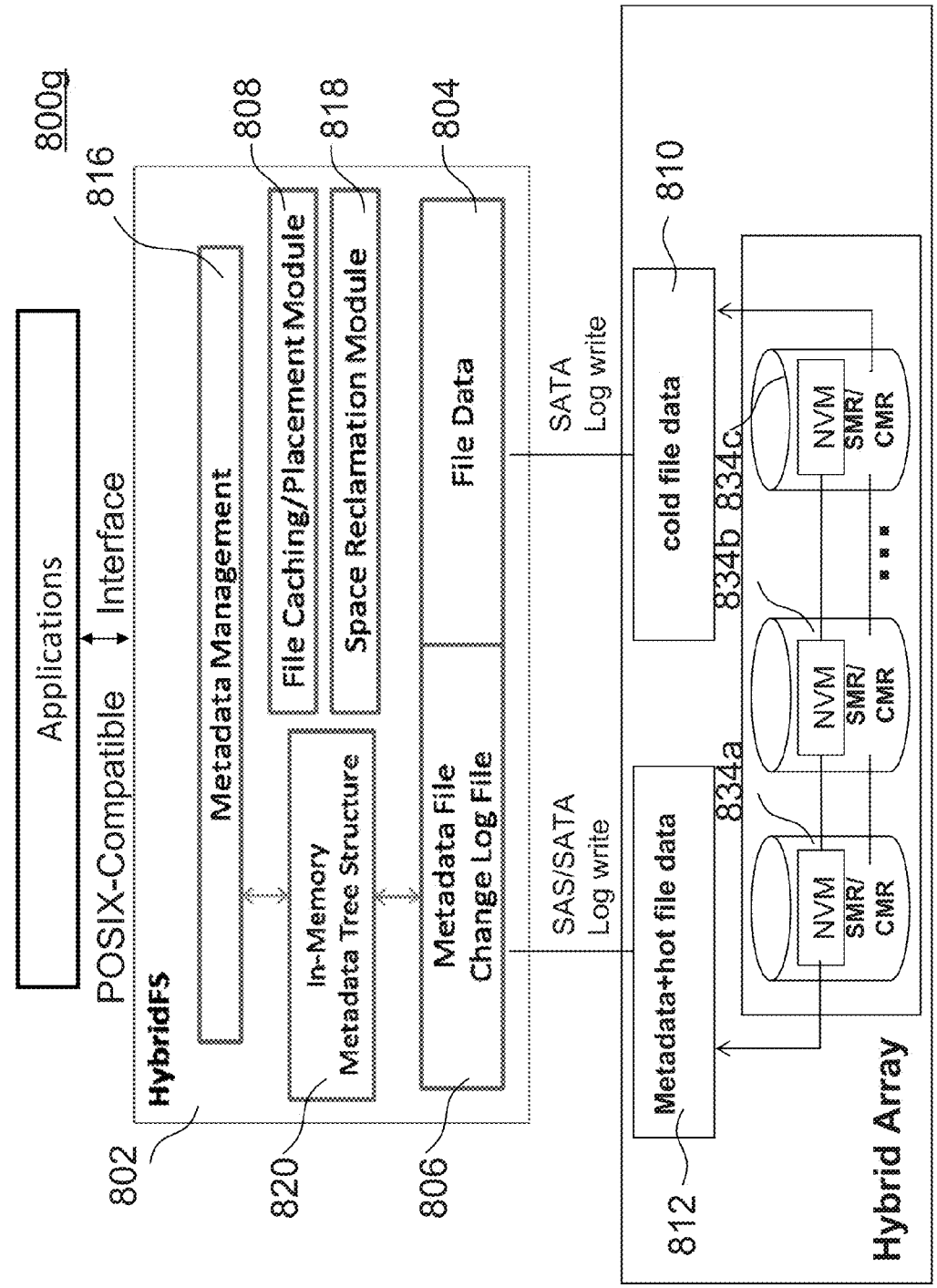
FIG. 8G illustrates a data storage system shown in FIG. 8A according to various embodiments coupled to a hybrid array.

FIG. 8G is a schematic 800g showing a data storage system shown in FIG. 8A according to various embodiments coupled to a hybrid array. The hybrid array may include a plurality of hybrid drives 834a, 834b, 834c etc. In various embodiments, each of the plurality of hybrid drives may include CMR and/or SMR zones as well as non-volatile memories (NVMs). Non-volatile memories (NVMs) may include flash memory, phase change memory, ferroelectric random access memory, Silicon-Oxide-Nitride-Oxide-Silicon (SONOS) memory, read-only memories, optical disc memory etc. The CMR and/or SMR zones may form the first portion 810 while the NVMs may form the second portion 812. In other words, the first portion 810 may include the CMR and/or SMR zones while the second portion 812 may include the NVMs. The first portion 810 may be configured to store cold file data while the second portion 812 may be configured to store file system metadata as well as hot file data. The storage may further include an array circuit coupled to the CMR and/or SMR zones and the NVMs. In various embodiments, the data storage system may include the storage, i,e, the hybrid array.

Figure 10:
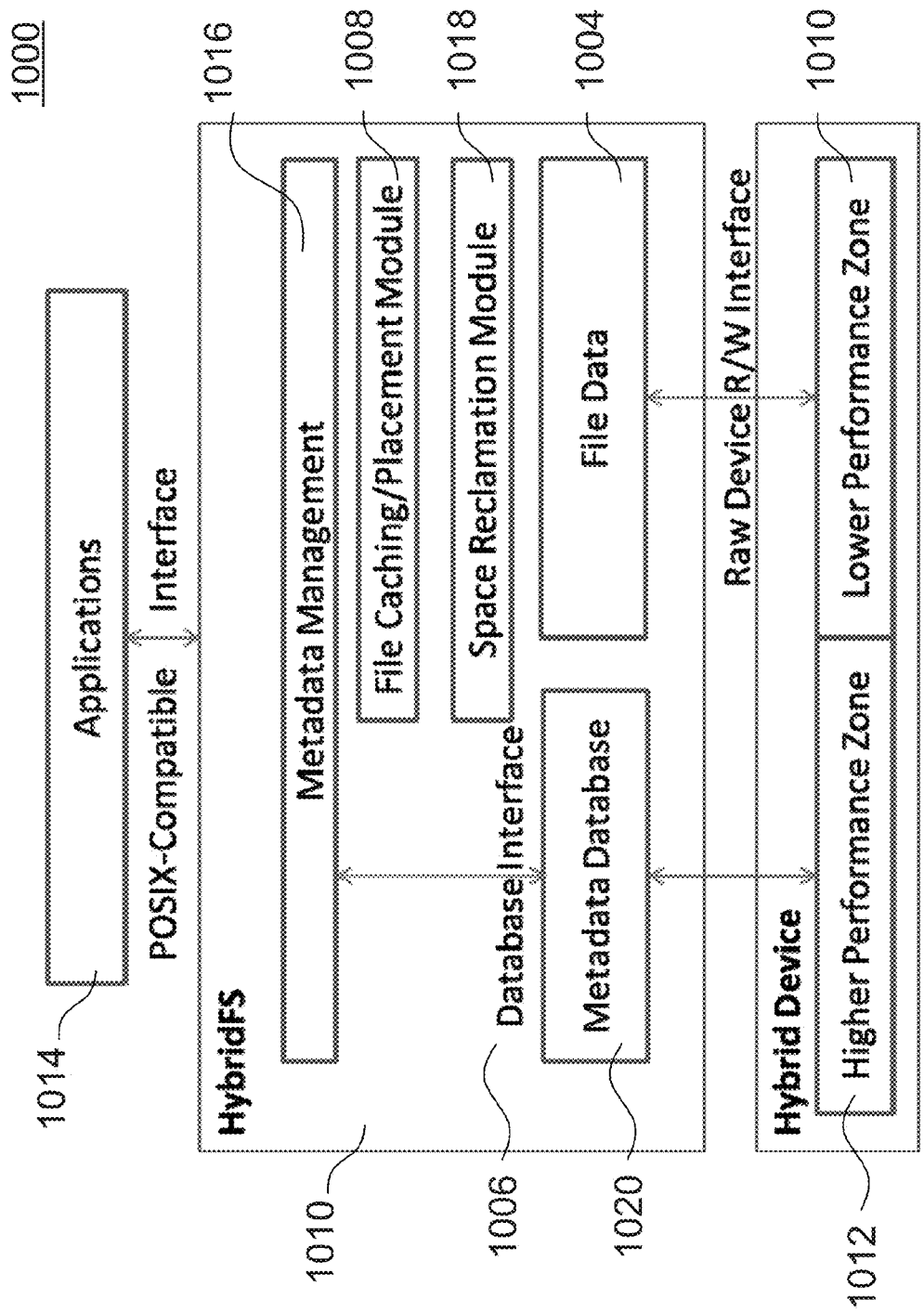
FIG. 10 shows a data storage system according to various embodiments.

FIG. 10 is a schematic 1000 showing a data storage system according to various embodiments. The data storage system may include a hybrid file system (HybridFS) 1002. The hybrid file system 1002 may include a file data module 1004 configured to control writing the data to a first portion (i.e. lower performance zone) 1010 in a log structured manner. The file data module 1004 may be implemented by a first control sub-circuit. The hybrid file system 1002 may further include a database interface 1006 configured to control writing to a metadata database 1020 in the second portion (i.e. higher performance zone) 1012 in either a log structured manner or a random access manner. The metadata database 1020 may be configured to store file system metadata. The database interface 1006 may be implemented by a second control sub-circuit. The second control sub-circuit may be electrically isolated from the first control sub-circuit or may be connected to the first control sub-circuit. The hybrid file system 1002 may include a file caching/placement module 1008 configured to determine whether to write data to the first portion or to the second portion. The file caching/placement module 1008 may be implemented by a determination circuit. Additionally, a metadata management module 1016 may alternatively or additionally be implemented by the determination circuit. In various embodiments, the metadata management module 1016 may at least be partially be implemented by the control circuit.

In various embodiments, the hybrid file system 1002 may be configured to provide user applications 1014 with a standard portable operating system interface (POSIX)-Compatible interface. The hybrid system 1002 may be developed based on the file system in user space (FUSE) framework.

In various embodiments, the file caching/placement module 1008 and/or the metadata management module 1016 may be configured to determine whether the data is file data or file system metadata. The file caching/placement module 1008 and/or the metadata management module 1016 may be configured to determine to write data to the first portion if the data is file data. The file caching/placement module 1008 and/or the metadata management module 1016 may be configured to determine to write data to the second portion if the data is file system metadata. The file caching/placement module 1008 and/or the metadata management module 1916 may be configured to determine to write data to the first portion 1010 (i.e. lower performance zone) if the data is file data, which is accessed sequentially and/or less frequently. On the other hand, the file caching/placement module 1008 and/or the metadata management module 1016 may be configured to determine to write data to the second portion 1012 (i.e. higher performance zone) if the data is file system metadata, which is accessed more frequently and/or more likely to be accessed randomly.

In various embodiments, the hybrid system 1002 may include a metadata database 1020. The metadata database 1020 may be configured to store file system metadata. The file system metadata may be stored in the metadata database 1020 as tables and/or records. The metadata management module 1016 may access the metadata database 1020 through database interface 1006. In various embodiments, the metadata database 1020 may be a Structured Query Language (SQL) relational database and may be accessed through SQL language. In various embodiments, the metadata database 1020 may be hosted in the second portion (i.e. higher performance zone) 1012 using a local file system. The local file system may also host cached data (other than file system metadata) in the second portion 1012. The metadata database 1020 may be managed by a database management system (DBMS). The database management system may include the database interface 1006. Various embodiments may provide greater flexibilities and/or richer interfaces. Various embodiments may however, incur extra performance overhead due to the database layer.

The first portion may include a plurality of bands or segments. Each band or segment may include a plurality of shingled or overlapping tracks. The file data module 1004 and/or the metadata management module 1016 may be configured to control writing the data to each band in the first portion in a log structured manner. Writing the data to each band in a log structured manner may include writing data, whether there is a relevant old data or not, in a sequential appending manner. Writing in a log structured manner may have improved performance compared to writing in a random access manner on storage medias such as magnetic disks and flash memories. Also, shingled magnetic recording zones may only be written in a log structured manner or sequentially due to the overlapping tracks. On the other hand, the metadata file/change log file module 1006 and/or the metadata management module 1016 may be configured to control writing to a second portion (i.e. higher performance zone) 1012 in either a log structured manner or a random access manner.

In various embodiments, the file data module 1004 and/or the metadata management module 1016 may be configured to control writing data to the first portion 1010 in the log structured manner. Controlling writing to the first portion 1010 in the log structured manner may include controlling writing data in the form of a circular log in the first portion 1010, the log having a header and an end defining the data written to the first portion 1010. The file data module 1004 and/or the metadata management module 1016 may be further configured to append new data to the header of the log, the new data causing the header to move relative to the end.

The hybrid file system 1002 may further include a space reclamation module 1018 for freeing up space by discarding the unwanted old data. The unwanted old data may be data stored in the storage deleted or replaced with updated data by the user or user applications 1014. The space reclamation module 1018 may be implemented by a garbage collector circuit or a space reclamation circuit.

In various embodiments, the space reclamation module 1018 may be configured to delete/modify old data using a file-based approach. The space reclamation module 1018 may be configured to write all wanted files stored on the storage as new data. The wanted files include all files, excluding files deleted or replaced with updated data by the user or user applications 1014. The new data may be written by appending to the header of the circular log in a sequential manner. The old data, including the old data of the unwanted files and the old data of the wanted files, are overwritten by the new data.

In various embodiments, the space reclamation module 1018 may be configured to delete/modify old data using a band-based approach. The first portion 1010 may include one or more bands/segments. Each band may include a plurality of shingled or overlapping tracks. The space reclamation module 1018 may be configured to select one or more bands/segments for space reclamation. The wanted old data in the selected band/segment are appended to the appending pointer or header of another band/segment of the one or more bands/segments as new data and the old data, including the wanted old data and the unwanted old data, are overwritten by the new data.

In various embodiments, metadata file/change log file module 1006 and/or the metadata management module 1016 may be configured to control writing data to the second portion 1012 in the log structured manner. Controlling writing to the second portion 1012 in the log structured manner may include controlling writing data in the form of a circular log in the second portion 1012, the log having a header and an end defining the data written to the second portion 1012. The metadata file/change log file module 1006 and/or the metadata management module 1016 may be further configured to append new data to the header of the log, the new data causing the header to move relative to the end.

The file caching/placement module 1008 and/or the metadata management module 1016 may be configured to control writing the data to the second portion 1012 in a log structured manner even if the data is file data based on further considerations. The further considerations may include popularity of the data/file and file size. The more popular data/file is accessed more often and may be determined to be stored/cached in the second portion (higher performance zone) 1012. Files having small file sizes may be stored/cached in the second portion 1012 to reduce small random access to the first portion (lower performance zone) 1010.

Figure 11:
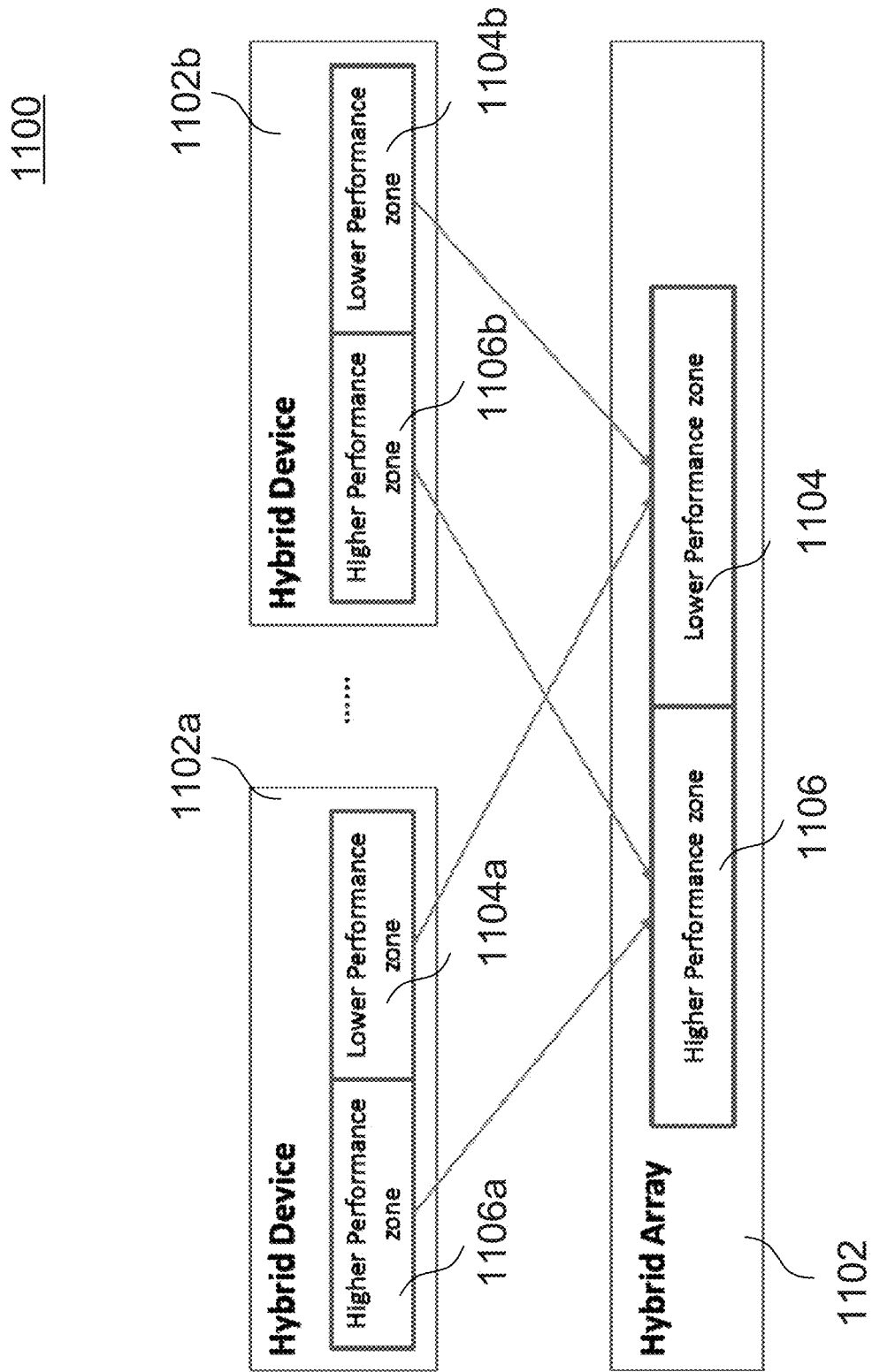
FIG. 11 shows a storage array according to various embodiments.

FIG. 11 is a schematic 1100 showing a storage array 1102 according to various embodiments. The storage array 1102 may also be referred to as a hybrid array. The storage array 1102 may include a plurality of hybrid devices 1102a, 1102b etc. The plurality of hybrid devices 1102a, 1102b may be controlled or connected by an array circuit. The storage array may include a first portion 1104 and a second portion 1106.

Each hybrid drive 1102a or 1102b may include a first portion 1104a, 1104b etc. and a second portion 1106a, 1106b etc. The first portion 1104a, 1104b etc. may also be referred to as a low performance zone. The second portion 1106a, 1106b etc. may also be referred to as a high performance zone. The first portions 1104a, 1104b etc. of the plurality of hybrid devices 1102a, 1102b may be combined to form the first portion 1104 of the storage array 1102. The second portions 1106a, 1106b etc. of the plurality of hybrid devices 1102a, 1102b may be combined to form the first portion 1106 of the storage array 1102. The first portions 1104a, 1104b etc. may be independent from the second portions 1106a, 1106b etc. The first portions 1104a, 1104b etc. may be combined in a different manner than the second portions 1106a, 1106b etc.

Figure 12:
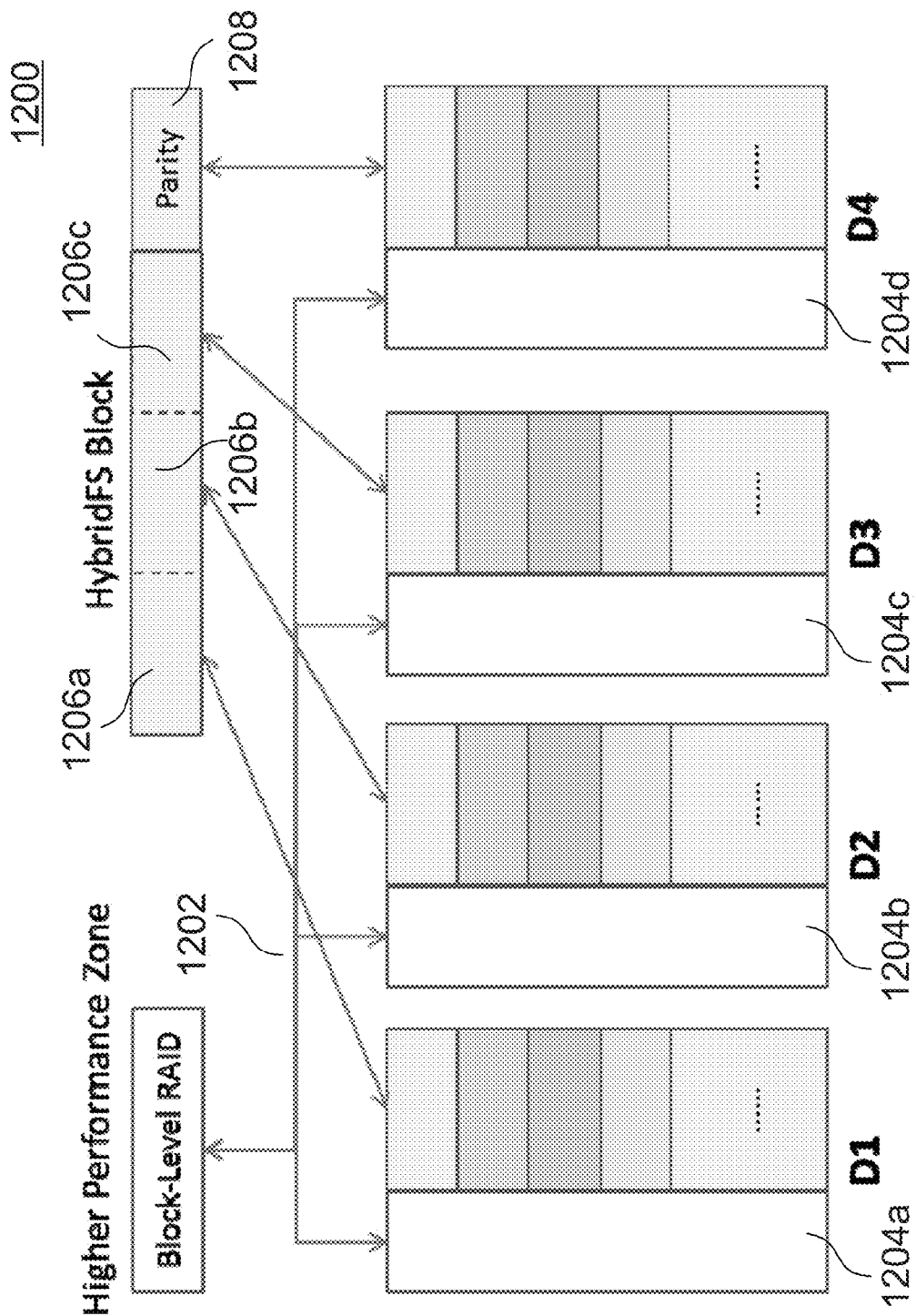
FIG. 12 shows a storage according to various embodiments.

FIG. 12 is a schematic 1200 showing a storage according to various embodiments. The storage may include a storage array. The storage may include an array circuit 1202. The storage may further include a plurality of hard disks 1204a, 1204b, 1204c, 1204d etc. controlled and/or coupled to the array circuit 1202. In various embodiments, the hybrid file system may be configured to implement the RAID function at the file level.

The first portion or the lower performance zones may be configured to be written in a log structure manner or sequential appending mode. The block-level RAID may not be suitable to be used for the first portion or the lower performance zones. The file-level RAID may be used for first portion or the lower performance zones. The second portion or the higher performance zones may be configured to be written with data in the random access manner and may not require data to be written in the sequential appending mode. The block-level RAID may be used for the second portion or the higher performance zones.

In various embodiments one hard disks 1204d of the plurality of hard disks 1204a, 1204b, 1204c, 1204d etc. may be configured to store parity information while the remaining hard disks 1204a, 1204b, 1204c etc. may be configured to store data. Each hard disk of the plurality of hard disks 1204a, 1204b, 1204c, 1204d etc. may be a hybrid hard disk. The parity information may be computed based on the data stored in the remaining hard disks. In various embodiments, data blocks of the data (e.g. file blocks) may be divided into a plurality of sub-blocks 1206a, 1206b, 1206d etc. The plurality of sub-blocks 1206a, 1206b, 1206d etc may be stored in the remaining hard disks 1204a, 1204b, 1204c etc. Each sub-block of the plurality of sub-blocks may be stored correspondingly in one hard disk of the remaining hard disks 1204a, 1204b, 1204c etc.

For instance, a data block (e.g. a file block) may be divided into a plurality of sequential sub-blocks 1206a, 1206b, 1206d etc. The sub-blocks 1206a, 1206b, 1206c etc. may be of equal size. Each sub-block of the plurality of sub-blocks 1206a, 1206b, 1206c etc. may be stored correspondingly in one hard disk of the remaining hard disks 1204a, 1204b, 1204c etc. In other words, the sub-block 1206a may be stored in hard disk 1204a. The sub-block 1206b, which is the sequential sub-block to sub-block 1206a, may be stored in hard disk 1204b. The sub-block 1206c, which is the sequential sub-block to sub-block 1206b, may be stored in hard disk 1204c. The parity information 1208 may be calculated as the XOR sum of the plurality of sub-blocks 1206a, 1206b, 1206c etc. Various embodiments may allow data to be stored in the first portion to be stored by dividing the data to be stored into the plurality of sub-blocks 1206a, 1206b, 1206c etc. and storing each sub-block of the plurality of sub-blocks 1206a, 1206b, 1206c etc. correspondingly in the one hard disk of the remaining hard disks 1204a, 1204b, 1204c etc.

In various embodiments, the hybrid file system may be configured to organize each data block as an independent parity stripe and write the parity strip to the storage array through one full-stripe write. The file blocks may be written to the storage array in appending mode such that writes to each of the hybrid hard disks also follow the appending mode.

Various embodiments may allow the hybrid file system to tolerate disk failure. Multiple disk failures may be prevented by using erasure codes. The implementation of the RAID function at the file level may allow the hybrid file system to optimize data reconstruction process when disk failure occurs. By traversing the metadata tree the hybrid file system may only reconstruct the failed blocks which are allocated by the file blocks, skipping the other invalid or free blocks.

Figure 13:
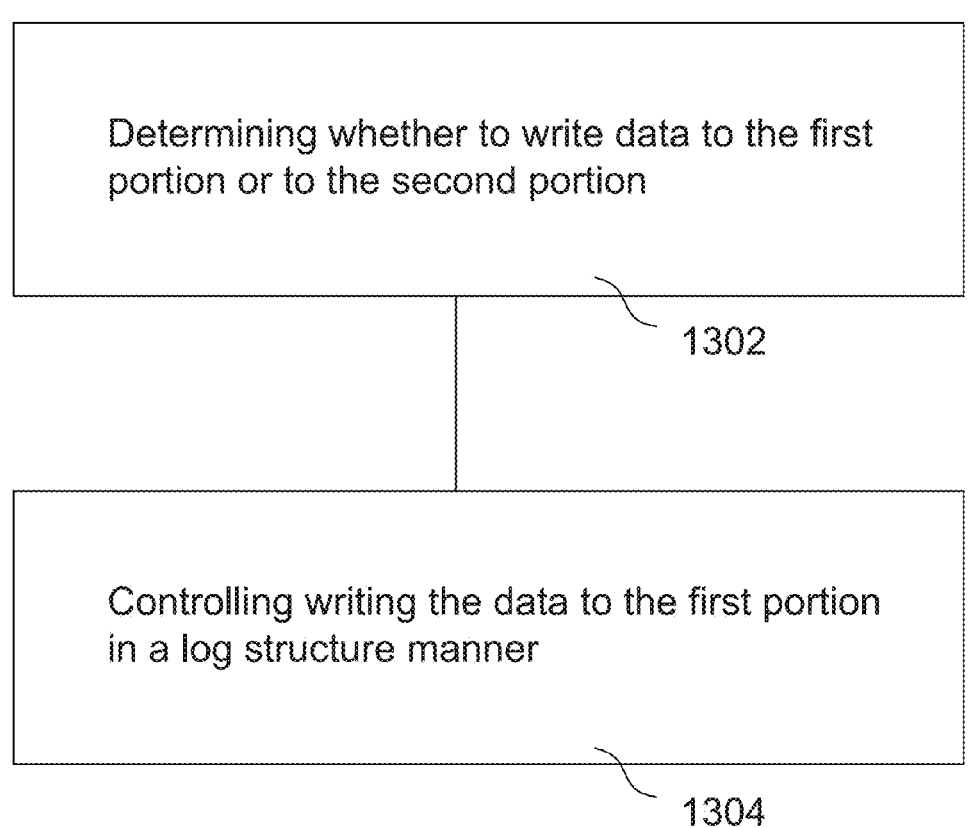
FIG. 13 shows a method of writing data to a storage in a data storage system according to various embodiments

FIG. 13 is a schematic 1300 showing a method of writing data to a storage in a data storage system according to various embodiments. The storage may include a first portion and a second portion. The method may include, in 1302, determining whether to write data to the first portion or to the second portion. The method may further include, in 1304, controlling writing the data to the first portion in a log structure manner.

In other words, the method may include determining to write data to the first portion or to a second portion of a storage. The method may further include, upon determination to write data to the first portion, controlling a writing element to control writing the data to the first portion in a log structured manner.

The method may further include controlling writing the data to the second portion in a random access manner. In various alternate embodiments, the method may include controlling writing the data to the second portion in a log structured manner.

Controlling writing the data to the first portion in a log structure manner may include writing the data to the first portion in the form of a circular log. The circular log may have a header and an end defining the data written to the first portion. Controlling writing the data to the first portion in a log structure manner may further include appending new data to the header of the log, the new data causing the header to move relative to the end.

The method may further include marking unwanted old data on the first portion. Controlling writing the data to the first portion in a log structure manner may further include writing of new data over old data by appending unmarked old data to the header and removing or discarding marked old data.

In various embodiments, the circular log may include a plurality of segments/bands. The first portion may include a plurality of shingled magnetic recording zones. Each segment/band of the plurality of segments may correspond to one or more of the plurality of shingled magnetic zones.

Controlling writing the data to the first portion in a log structure manner may include controlling writing the data within each segment/band in a sequential manner.

The method may further include selecting one segment/band out of the plurality of segments for writing the new data over the old data. Controlling writing the data to the first/second portion in a log structure manner may further include appending unmarked old data as new data to the appending pointer or header of another band/segment of the one or more bands/segments in the first/second portion. Controlling writing the data to the first/second portion in a log structure manner may further include writing of new data over old data by appending unmarked old data to the header or the appending pointer of another band/segments of the one or more bands/segments and removing or discarding marked old data.

Determining whether to write data to the first portion or to the second portion may include determining whether to write data to the first portion or to the second portion based on the attributes of the data.

Determining whether to write data to the first portion or to the second portion may include determining whether to write data to the first portion or to the second portion based on whether a relevant old data is located in the first portion or the second portion.

The method may further include determining whether to read the data from the first portion or from the second portion.

The method may further include monitoring an access pattern of the data in the first portion and the second portion.

The method may further include moving the data between the first portion and the second portion based on the access pattern.

In various embodiments, the data is controlled to be written to the first portion in a log structured manner if the data is determined to be written to the first portion.

In various embodiments, the data is controlled to be written to the second portion in a random access manner is the data is determined to be written to the second portion. In various alternate embodiments, the data is controlled to be written to the second portion in a log structured manner is data is determined to be written to the second portion.

Determining whether to write data to the first portion or to the second portion may include determining whether the data is file data to file system metadata. In various embodiments, the data may be written to the first portion if the data is determined to be file data. The data may be written to the second portion if the data is determined to be file system metadata.

In various embodiments, the method includes storing the file system metadata. The file system metadata may be stored in a memory (metadata memory).

The file system metadata may be stored in the form of a tree structure including a plurality of nodes, each node including metadata information of a program file or a directory.

The method may further include writing the file system metadata (in the memory) to the second portion at periodic intervals, or after metadata change operations.

In various embodiments, the method includes providing the storage including the first portion and the second portion.

The second portion may include one or more conventional magnetic recording (CMR) zones. The first portion may include one or more shingled magnetic recording (SMR) zones.

The storage may include a hard disk. The storage may include a hybrid drive. The hybrid drive may include a first medium and a second medium. The first portion may include the first medium and the second portion may include the second medium.

The storage may include a storage array. The storage may include an array circuit. The storage may further include a plurality of hard disks controlled by or coupled to the array circuit. Each of the plurality of hard disks may include a plurality of shingled magnetic recording (SMR) zones. Each of the plurality of hard disks may include a conventional magnetic recording (CMR) zone.

The plurality of hard disks may form or include a first portion including the shingled magnetic recording zones of the plurality of hard disks. The plurality of hard disks may form or include a second portion comprising the conventional magnetic recording zones of the plurality of hard disks.

The storage array may be or include a redundant array of independent hard disks (RAID). One hard disk of the plurality of hard disks may be configured to store parity information.

The remaining hard disks of the plurality of hard disks may be configured to store data. The parity information may be computed based on the data stored in the remaining hard disks. Data blocks of the data may be divided into a plurality of sub-blocks. The plurality of sub-blocks may be stored in the remaining hard disks. Each sub-block of the plurality of sub-blocks may be stored correspondingly in one hard disk of the remaining hard disks.

FIG. 14 shows a schematic 1400 of a method of forming a hard disk according to various embodiments. The method may include, in 1402, forming a plurality of shingled magnetic recording (SMR) zones in the hard disk. The method may further include, in 1404, forming a conventional magnetic recording (CMR) zone in the hard disk.

In other words, a method of fabricating a hard disk may include patterning or forming a conventional magnetic recording zone. The method may further include patterning or forming a plurality of shingled magnetic recording (SMR) zones.

In various embodiments, a first shingled magnetic recording zone of the plurality of shingled magnetic recording zones may be separated from a second shingled magnetic recording zone of the plurality of shingled magnetic recording zones by an inter-zone gap.

In various embodiments, a first shingled magnetic recording zone of the plurality of shingled magnetic recording zones may be separated from a second shingled magnetic recording zone of the plurality of shingled magnetic recording zones by the conventional magnetic recording zone.

Each shingled magnetic recording zone may include a plurality of shingled tracks. Each conventional magnetic recording zone may include one or more isolated tracks.

In various embodiments, the shingled magnetic recording zones may be configured to be written with data in a log structured manner. In various embodiments, the conventional magnetic recording zones may be configured to be written with data in a random access manner.

In various embodiments, a method of forming a storage array may be provided. The method may include providing an array circuit. The method may further include providing a plurality of hard disks controlled by or coupled to the array circuit. The plurality of hard disks may include a first portion including the shingled magnetic recording zones of the plurality of hard disks. The plurality of hard disks may further include a second portion including the conventional magnetic recording zones of the plurality of hard disks.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A data storage system comprising:
 a determination circuit configured to determine whether to write first data to a first portion of a memory or to a second portion of the memory, wherein the first portion comprises shingled-magnetic recording zones, and wherein the second portion comprises non-shingled-magnetic recording zones; and
 a control circuit configured to control the writing of the first data to the first portion in a log structured manner, wherein the control circuit is configured to control the writing of the first data such that the first data is stored in a form of a circular log, wherein the circular log has only one header and only one end, wherein the header defines the first data as written to the first portion, wherein the circular log comprises a plurality of ring-shaped bands of the memory, and wherein the control circuit is configured to, during the writing of the first data to the first portion, append the first data to the header and move the header relative to the end.

2. The data storage system according to claim 1, wherein the control circuit is configured to control the writing of the first data to the second portion in a random access manner.

3. The data storage system according to claim 1, further comprising a marking circuit configured to mark unwanted old data on the first portion,
wherein the control circuit is configured to, subsequent to marking the unwanted old data, (i) append unmarked old data to the header, and (ii) write the first data over the marked unwanted old data.

4. The data storage system according to claim 1, wherein:
the determination circuit is configured to, based on attributes of the first data, determine whether to write the first data to the first portion or to the second portion; and
the attributes comprise a type of file, a file size, and a file popularity value.

5. The data storage system according to claim 1, wherein the determination circuit is configured to determine whether to write the first data to the first portion or to the second portion based on (i) whether old data is located in the first portion or the second portion, and (ii) whether the old data is to be overwritten by the first data.

6. The data storage system according to claim 1, further comprising:
an access monitor circuit configured to monitor an access pattern of the first data in the first portion and the second portion; and
a file migration circuit configured to move the first data between the first portion and the second portion based on the access pattern.

7. The data storage system according to claim 1, wherein:
the determination circuit is configured to determine whether the first data is metadata; and
control circuit is configured to write the first data to (i) the first portion if the determination circuit determines the first data is not metadata, and (ii) the second portion if the determination circuit determines the first data is metadata.

8. The data storage system according to claim 1, the control circuit is configured to store metadata in the second portion, wherein:
the metadata is stored in a form of a tree structure;
the tree structure comprises a plurality of nodes;
each of the plurality of nodes comprises metadata information of a program file or a directory; and
the control circuit is configured to write the metadata to the second portion at periodic intervals and when the metadata indicates a change in operations.

9. A data storage system comprising:
a first hard disk comprising
a first portion comprising a plurality of shingled magnetic recording zones, and
a second portion comprising a non-shingled magnetic recording zone;
a first management module configured to (i) control access to the plurality of shingled magnetic recording zones, and (ii) record first data in the plurality of shingled magnetic recording zones in a log structured manner, wherein the first data does not include metadata; and
a second management module separate from the first management module and configured to (i) control access to the non-shingled magnetic recording zone, and (ii) record metadata in the non-shingled magnetic recording zone in a random access manner,
wherein
the metadata is stored in a form of a tree structure,
the tree structure comprises a plurality of nodes,
each of the plurality of nodes comprises metadata information of a program file or a directory, and
the second management module is configured to write the metadata to the second portion at periodic intervals and when the metadata indicates a change in operations.

10. The data storage system according to claim 9, wherein:
the plurality of shingled magnetic recording zones comprises a first shingled magnetic recording zone and a second shingled magnetic recording zone; and
the first shingled magnetic recording zone is separated from the second shingled magnetic recording zone by an inter-zone gap.

11. The data storage system according to claim 9, further comprising:
an array circuit; and
a plurality of hard disks controlled by the array circuit, wherein the plurality of hard disks comprise the first hard disk,
wherein the plurality of hard disks comprise
respective pluralities of shingled magnetic recording zones; and
respective non-shingled magnetic recording zones.

12. The data storage system of claim 9, further comprising a determination circuit configured to (i) determine whether to store second data in the first portion or the second portion, and (ii) based on the determination, provide the second data to one of the first management module or the second management module.

13. The data storage system of claim 12, wherein the determination circuit is configured to provide the second data to the first management module if no data stored on the hard disk is an old version of the second data.

14. A method of writing data to a memory in a data storage system, wherein the memory comprises a first portion and a second portion, wherein the first portion comprises shingled-magnetic recording zones, and wherein the second portion comprises non-shingled-magnetic recording zones, the method comprising:
determining whether to write data to the first portion or to the second portion; and
controlling the writing of the data to the first portion in a log structured manner such that the data is stored in a form of a circular log, wherein the circular log has only one header and only one end, wherein the header defines the data as written to the first portion, wherein the circular log comprises a plurality of ring-shaped bands of the memory, and wherein the writing of the data to the first portion includes appending the data to the header and moving the header relative to the end.

* * * * *